US011931607B2

(12) United States Patent
Anvari

(10) Patent No.: US 11,931,607 B2
(45) **Date of Patent: *Mar. 19, 2024**

(54) FACE MASK WITH AUXILIARY OXYGEN

(71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/986,005

(22) Filed: Nov. 14, 2022

(65) Prior Publication Data

US 2024/0058629 A1 Feb. 22, 2024

Related U.S. Application Data

(63) Continuation-in-part of application No. 17/891,205, filed on Aug. 19, 2022, now Pat. No. 11,779,781.

(51) Int. Cl.

| | |
|---|---|
| ***A62B 7/00*** | (2006.01) |
| ***A62B 7/02*** | (2006.01) |
| ***A62B 7/10*** | (2006.01) |
| ***A62B 7/12*** | (2006.01) |
| ***A62B 9/00*** | (2006.01) |
| ***A62B 9/02*** | (2006.01) |
| ***A62B 18/00*** | (2006.01) |
| ***A62B 18/02*** | (2006.01) |

(Continued)

(52) U.S. Cl.

CPC .................. *A62B 7/02* (2013.01); *A62B 7/10* (2013.01); *A62B 7/12* (2013.01); *A62B 9/00* (2013.01); *A62B 9/022* (2013.01); *A62B 18/006* (2013.01); *A62B 18/025* (2013.01); *A62B 18/084* (2013.01); *A62B 18/10* (2013.01); *A62B 23/02* (2013.01)

(58) Field of Classification Search

CPC ....... A62B 7/10; A62B 18/003; A62B 18/006; A62B 18/02; A62B 18/025; A62B 18/04; A62B 18/045; A62B 18/08; A62B 18/084; A62B 23/00; A62B 23/02; A41D 13/1153; A61M 16/105

See application file for complete search history.

(56) References Cited

U.S. PATENT DOCUMENTS 2,318,790 A * 5/1943 Martindale ............ A41D 13/11 128/206.16

2,758,307 A * 8/1956 Treiber .............. A41D 13/1184 2/9

(Continued)

*Primary Examiner* — LaToya M Louis

(57) ABSTRACT

A face mask uses a neck hanger with axillary oxygen to facilitate the flow of filtered fresh air inside the face mask for inhaling. Neck hanger filters the fresh air from the environment mixes with oxygen that is stored in the neck hanger before releasing inside the face mask for inhaling. The neck hanger is a lightweight tube that houses fans, HEPA or ULPA filters, compressed oxygen, a regulator, and a battery with a control circuit. One fan sucks the air from the environment that after being filtered and mixed with oxygen is blown into the face mask through an air pipe that is attached to both the neck hanger and face mask. The exhaled air from interior of the mask is sucked by a second fan through another air pipe, then filtered and released into the environment.

10 Claims, 24 Drawing Sheets

Neck Hanger 1100

(51) Int. Cl.

| | |
|---|---|
| ***A62B 18/08*** | (2006.01) |
| ***A62B 18/10*** | (2006.01) |
| ***A62B 23/02*** | (2006.01) |

(56) References Cited

U.S. PATENT DOCUMENTS

| | | | | |
|---|---|---|---|---|
| 3,921,223 | A * | 11/1975 | Hoyecki | A61F 9/068 2/9 |
| H1361 | H * | 10/1994 | Tardiff, Jr. | 2/205 |
| 7,481,221 | B2 * | 1/2009 | Kullik | A61M 16/0009 128/204.11 |
| 7,828,524 | B2 * | 11/2010 | Chen | F04D 25/084 415/206 |
| 9,248,248 | B2 * | 2/2016 | Virr | A61M 16/0066 |
| 10,537,754 | B1 * | 1/2020 | Vukelja | A62B 18/003 |
| 10,874,151 | B1 * | 12/2020 | Clark | A41D 13/0025 |
| 11,471,711 | B2 * | 10/2022 | Connor | A62B 18/08 |
| 2005/0028250 | A1 * | 2/2005 | Zaic | A42B 3/16 2/209 |
| 2005/0229557 | A1 * | 10/2005 | Little | A47C 7/383 55/385.1 |
| 2008/0237287 | A1 * | 10/2008 | Mitchinson | A45F 3/04 224/645 |
| 2009/0127304 | A1 * | 5/2009 | Uygur | A45F 5/02 224/250 |
| 2011/0079225 | A1 * | 4/2011 | Vole | A61M 15/08 128/206.24 |
| 2013/0227768 | A1 * | 9/2013 | Van Waes | A42B 3/185 2/10 |
| 2014/0196187 | A1 * | 7/2014 | Beliveau | A41D 13/11 2/9 |
| 2014/0261428 | A1 * | 9/2014 | Chen | A62B 23/02 128/205.12 |
| 2015/0290479 | A1 * | 10/2015 | Augustine | A62B 23/02 128/200.28 |
| 2016/0058134 | A1 * | 3/2016 | Blunt | A44C 5/0023 454/329 |
| 2017/0361134 | A1 * | 12/2017 | Virr | A62B 18/082 |
| 2018/0001120 | A1 * | 1/2018 | Virr | A62B 18/025 |
| 2018/0078798 | A1 * | 3/2018 | Fabian | A61B 5/0816 |
| 2018/0318540 | A1 * | 11/2018 | Barlow | A61M 16/0611 |
| 2020/0114178 | A1 * | 4/2020 | Waterford | A62B 23/02 |
| 2020/0289777 | A1 * | 9/2020 | Bearne | A61M 16/06 |
| 2020/0397087 | A1 * | 12/2020 | Crenshaw | A41D 1/002 |
| 2020/0406069 | A1 * | 12/2020 | Fu | A62B 23/02 |
| 2021/0077762 | A1 * | 3/2021 | Mauger | A61M 16/107 |
| 2021/0093903 | A1 * | 4/2021 | Edwards | A62B 18/006 |
| 2021/0339058 | A1 * | 11/2021 | Connor | A62B 18/08 |
| 2021/0345694 | A1 * | 11/2021 | Volk | A41D 13/1161 |
| 2021/0345702 | A1 * | 11/2021 | Volk | A41D 13/11 |
| 2021/0379312 | A1 * | 12/2021 | Bernard | A61M 16/209 |
| 2021/0386291 | A1 * | 12/2021 | Oddo | A61B 5/4806 |
| 2022/0008760 | A1 * | 1/2022 | Chen | A62B 18/088 |
| 2022/0023790 | A1 * | 1/2022 | Lee | A62B 18/003 |
| 2022/0118288 | A1 * | 4/2022 | Space | B01D 46/0047 |
| 2022/0143344 | A1 * | 5/2022 | Mauger | A62B 7/10 |
| 2022/0161065 | A1 * | 5/2022 | Tindall | A62B 7/10 |
| 2022/0266068 | A1 * | 8/2022 | Connor | A62B 18/08 |
| 2022/0305301 | A1 * | 9/2022 | Yoon | A62B 18/003 |
| 2022/0387829 | A1 * | 12/2022 | Mattila | A62B 18/025 |
| 2023/0011058 | A1 * | 1/2023 | Squires | A41D 13/1107 |

* cited by examiner

Neck Hanger 1000

Neck Hanger 1100

Neck Hanger 1100

Neck Hanger 1200

Neck Hanger 1200

Neck hanger Figure on the right shows a detail of neck hanger figure on the left Figure on the right shows a detail of neck hanger attached to the mask on the left figure Figure on the right shows a detail of neck hanger attached to the mask on the left figure Figure on the right shows a detail of neck hanger attached to the mask on the left figure Smart phone on the left communicates wirelessly with the face mask with Neck hanger on the right figure

FACE MASK WITH AUXILIARY OXYGEN

The application claims priority to the following related applications and included here are as a reference.

Application: U.S. patent application Ser. No. 17/891,205 filed Aug. 19, 2022.

Application: U.S. patent application No. 63/272,659 filed Oct. 27, 2021.

BACKGROUND

Controlling air pollution in the environment has become increasingly important owing to the health risks of exposure to high concentrations of harmful air pollutants. PM2.5 or particles that make the aft polluted and have diameter less than 2.5 micrometres (more than 100 times thinner than a human hair) remain suspended in the air for longer time. These particles are formed because of burning fuel, chemical reactions that take place in the air, and other sources of aerosol droplets. To protect people against the harmful effects of air pollution, filtering of these pollutants is significant. Thus, understanding the filtration performance of solutions is essential for assessing the aft quality.

Masks have been on the market for many years and are especially suitable in the "urban environment", i.e., when walking, biking, and commuting in the city and having to get through heavy traffic where cars are the source of pollution (especially those diesel cars). The masks have always been mentioned as an effective tool against environmental threats. They are considered as protective equipment to preserve the respiratory system against the non-desirable air droplets and aerosols such as the viral or pollution particles.

The aerosols can be pollution existence in the air, or the infectious airborne viruses initiated from the sneezing, coughing of the infected people. The filtration efficiency of the different masks against these aerosols are not the same, as the particles have different sizes, shapes, and properties. Therefore, the challenge is to fabricate the filtration masks with higher efficiency to decrease the penetration percentage at the nastiest conditions. To achieve this concept, knowledge about the mechanisms of the penetration of the aerosols through the masks at different effective environmental conditions is necessary.

This application discloses a novel face mask with auxiliary oxygen. Face mask uses a neck hanger that facilitates flow of filtered fresh air from the environment mixed with purified oxygen inside the face mask for inhaling. The neck hanger is a lightweight tube that houses two fans, HEPA or ULPA filters, a purified oxygen tank with a regulator, and a battery with a controller circuit. One fan sucks the air from the environment and after being filtered and mixed with purified oxygen is blown into the face mask through an air pipe that is attached to both the neck hanger and the face mask. The exhaled air from the nose or mouth is sucked by a second fan through another air pipe, then filtered and released into the environment.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect, a face mask that is used for protection against aerosols in the environment has a neck hanger or a head ring.

In another aspect, the neck hanger or head ring are connected to the face mask via two flexible air pipes.

In another aspect, both head ring and neck hanger are tubes with circular, rectangular, or proprietary cross sections.

In one aspect, both neck hanger and head ring use two fans, one for sucking the air from the environment and one for sucking the interior air of the face mask.

In another aspect, both neck hanger and head ring use two filers, one for filtering sucked air from the environment and one for filtering sucked air from interior of the face mask.

In one aspect, the filtered air from the environment is released into the interior of the face mask and the filtered air from interior of the face mask is released into the environment.

In another aspect, the filtered air from interior of the face mask through some opening holes on the peripheral of neck hanger or head ring is blown towards head and face of the person wearing the face mask for cooling.

In one aspect, the filtered air from the environment is divided into two portions, one is released into the interior of the face mask through an air pipe connected to the face mask and neck hanger or head ring and one portion is blown towards the face and the neck (head) of the person wearing the face mask through some opening holes on the peripheral of head ring or neck hanger.

In one aspect, the area of opening holes across the peripheral of neck hanger and head ring are different to provide a uniform air flow towards the face, neck, and head.

In another aspect, there is a container for oxygen inside the neck hanger or head ring.

In one aspect, the oxygen container is a tube within the neck hanger and head ring.

In one aspect, part or neck hanger and head ring stores compressed oxygen.

In another aspect, the neck hanger or head ring has valve to refill the oxygen tank.

In one aspect, the neck hanger or head ring has a regulator that controls the pressure of oxygen tank to a working pressure followed with an oxygen flow adjuster to control and measure the flow of oxygen to the face mask.

In another aspect, the filtered air sucked by sucking fan from the environment is mixed with oxygen before being released to the face mask through an air pipe.

In one aspect, the neck hanger or head ring has a housing for a control circuit and a power supply.

In another aspect, the control circuit controls the speed of the fans and various sensors used by the neck hanger or head ring.

In one aspect, sensors are located at various locations of the neck hanger head ring or face mask to control various functions and measure various data.

In another aspect, sensors are not on all the time. They are switched on and off as needed to save power. The switching on/off can be configured in the control circuit and the control circuit based on the configuration parameters turn the sensors on, collect information data for processing and then turn the sensors off to save power.

In one aspect, the power supply uses a rechargeable battery.

In another aspect, the rechargeable battery is charged by solar power using micro-panels (small panels) attached to external surface of the face mask and external surface of the head hanger or head ring.

In one aspect, the power supply has a DC (Direct Current) converter circuit to convert solar energy to the DC voltage required for charging the battery.

In one aspect, the rechargeable battery is charged through a USB (universal serial bus) or other power ports.

In another aspect, a charger with a USB or other power cords is used to connect to neck hanger or head ring for charging the battery.

In one aspect, the control circuit and battery can be removed and replaced.

In another aspect, neck hanger or head ring has a physical activation key or nob attached to the exterior surface of the neck hanger or head ring.

In one aspect, the neck hanger or the head ring has a reset bottom or can be reset through USB port or a wireless transceiver.

In one aspect, the USB port is used to communicated with an external device for configuration, download software, and diagnostic.

In another aspect, the control circuit has a transceiver to communicated wirelessly with an external device for configuration, software downloads and diagnostic.

In one aspect, the transceiver used by control circuit is a Bluetooth, Zigbee, infrared, or WiFi.

In another aspect, the transceiver supports fifth generation (5G), sixth generation (6G), or beyond 5G/6G and allows face mask with neck hanger or head ring to act as an Internet of Things (IoT) device to communicate with 5G, 6G, beyond 5G/6G or WiFi IoT network.

In one aspect, the control circuit controls all functions of the face mask with the neck hanger.

In another aspect, the environment air is passed through a filter before being sucked by a sucking fan.

In one aspect, both air pipes that are connected to the neck hanger and the face mask also performs filtering of the air sucked from environment and the contaminated air sucked from interior of the face mask.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications, and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
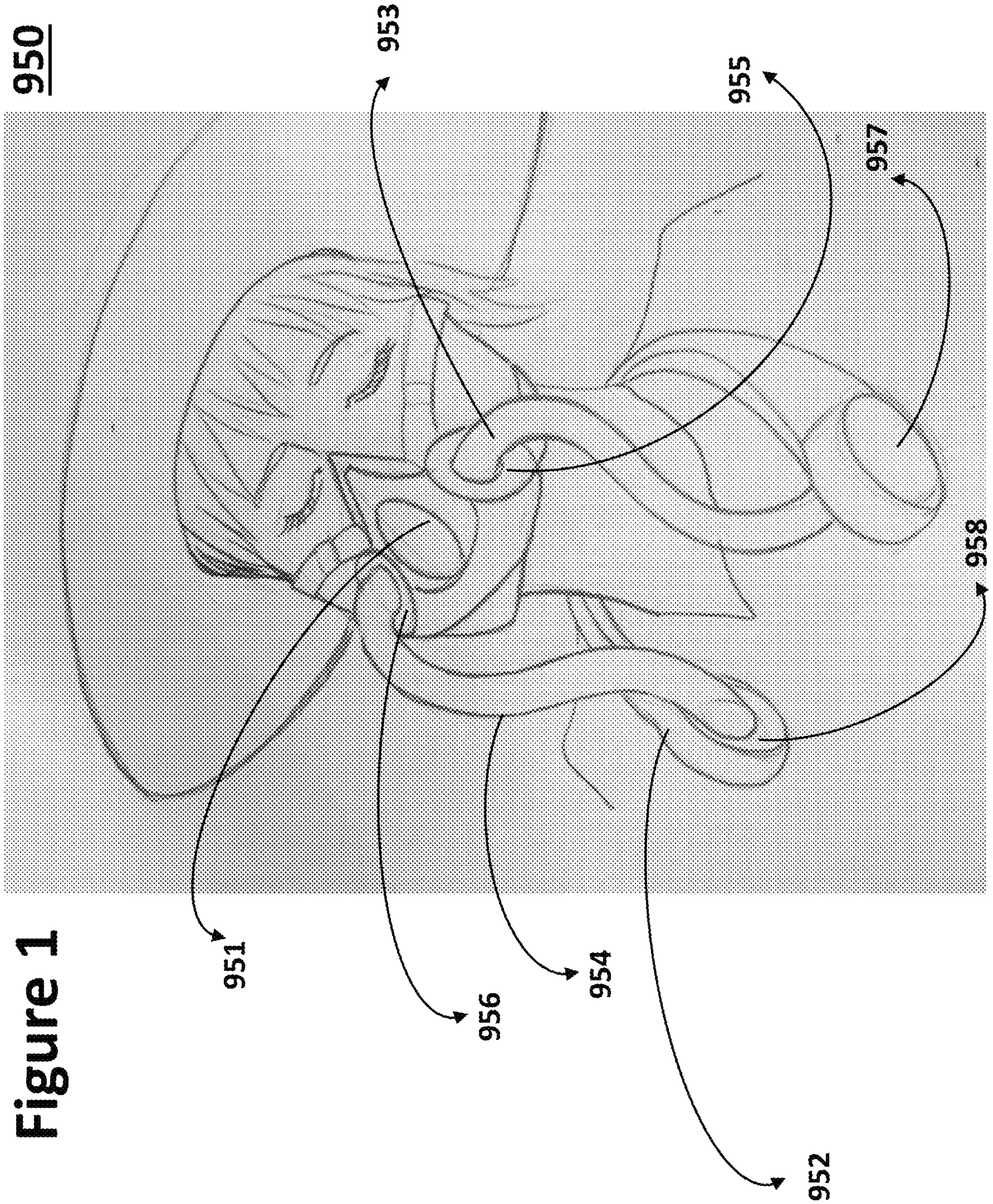
FIG. 1 illustrates a face mask with neck hanger.

FIG. 1 depicts a novel face mask with a neck hanger 950. The face mask 950 comprises of a typical face mask 951, an air pipe 953 that receives air from a neck hanger 952 using fan 957 and inject it into the face mask 951, an air pipe 954 that receives contaminated air from interior of the face mask 951 and delivers it to neck hanger 952. Air pipes 953 and 954 are attached to the face mask 951 through connectors 955 and 956. Fresh air is sucked from free space by neck hanger 952 using a sucking fan and delivered to face mask 951 using an air pipe 953 that is connected to both neck hanger 952 and face mask 951. Contaminated air from interior of the face mask 951 is received by air pipe 954 that is connected to both face mask 951 and neck hanger 952 and delivered to neck hanger 952 to be sucked by fan 958 and released into free space. The air pipes 953 and 954 may be part of neck hanger 952 or face mask 951.

In one embodiment, the neck hanger 952 is also used as a neck cooler by blowing some of the air it sucks by fan 957 from free space towards the neck.

In one embodiment, the neck hanger 952 is used as a neck cooler by blowing the filtered contaminated air received from interior of the face mask 951 towards the neck.

In one embodiment, the neck hanger 952 is used as a neck cooler by blowing some of the filtered environment air sucked air by fan 957 and the filtered contaminated air received from the interior of the face mask 951 towards the neck using air apertures or opening holes.

In another embodiment, the air flow of air aperture or opening hole is controlled by changing the opening of the aperture or hole In another embodiment, the neck hanger 952 sucks the air from free space using fan 957 and send it to the face mask 951 without filtering.

In one embodiment, the neck hanger 952 sucks the air from free space using fan 957 and send it to the face mask 951 after being filtered.

In another embodiment, the neck hanger 952 sucks the air from free space using fan 957 and sends some of it after being filtered into the interior of the face mask 951 and blow the remaining of the sucked air filtered or unfiltered towards the neck for cooling.

In one embodiment, the air pipes 953 and 954 are part of the neck hanger 952 and can be slide inside the neck hanger 952 when not connected to the face mask 951.

In one embodiment, the air pipes 953 and 954 are independent components and are connected to both face mask 951 and neck hanger 952 through various simple (connectors) methods that prevent any air leak.

In another embodiment, the amount of air passed through interior of the face mask 951 is controlled by various known practical methods such as speed of fan, the amount of sucked air that is used for cooling, releasing extra air, etc.

In another embodiment, the amount of air used by neck hanger 952 for cooling neck (back of the head) is controlled by various known practical methods such as opening and closing the apertures or holes that blow the air, reducing the opening of the apertures or holes, reducing fan speed, etc.

In one embodiment, the amount of sucked air from free space (environment) by fan 957 and contaminated air from interior of the mask by fan 958 is controlled and adjusted through various known practical methods such changing the DC voltage applied to the fans.

In another embodiment, neck hanger 952 uses fan 958 to suck the contaminated air from the interior of the face mask 951 through air pipe 954 as well as some air from free space to use for cooling the neck (or back of the head) through apertures or opening holes on peripheral of the neck hanger 952.

In one embodiment, the neck hanger 952 stores purified oxygen in the neck hanger 952 and through an injection aperture mixes a controlled amount of purified oxygen with filtered or unfiltered air sucked from free space by fan 957 before sending the mixed air through air pipe 953 into the interior of the face mask 951.

In another embodiment, the amount of purified oxygen that mixes with sucked and filtered or unfiltered air from free space is controlled for different applications.

In one embodiment, the novel face mask with a neck hanger 950 is used for various applications when body needs air with required oxygen level. These applications are people with asthma, high elevation hikers, hospital patients, nurses, doctors, miners, gliders, people with breathing problem, people with heart problem, people with medical problems that need higher level of oxygen, skiers at high elevations, ordinary people in areas with high level of air pollution (cities), fire fighters, tourist in high elevation places, factory workers, carpenters, chemical lab workers, airplane passengers, and any other application that requires a face mask.

Figure 2:
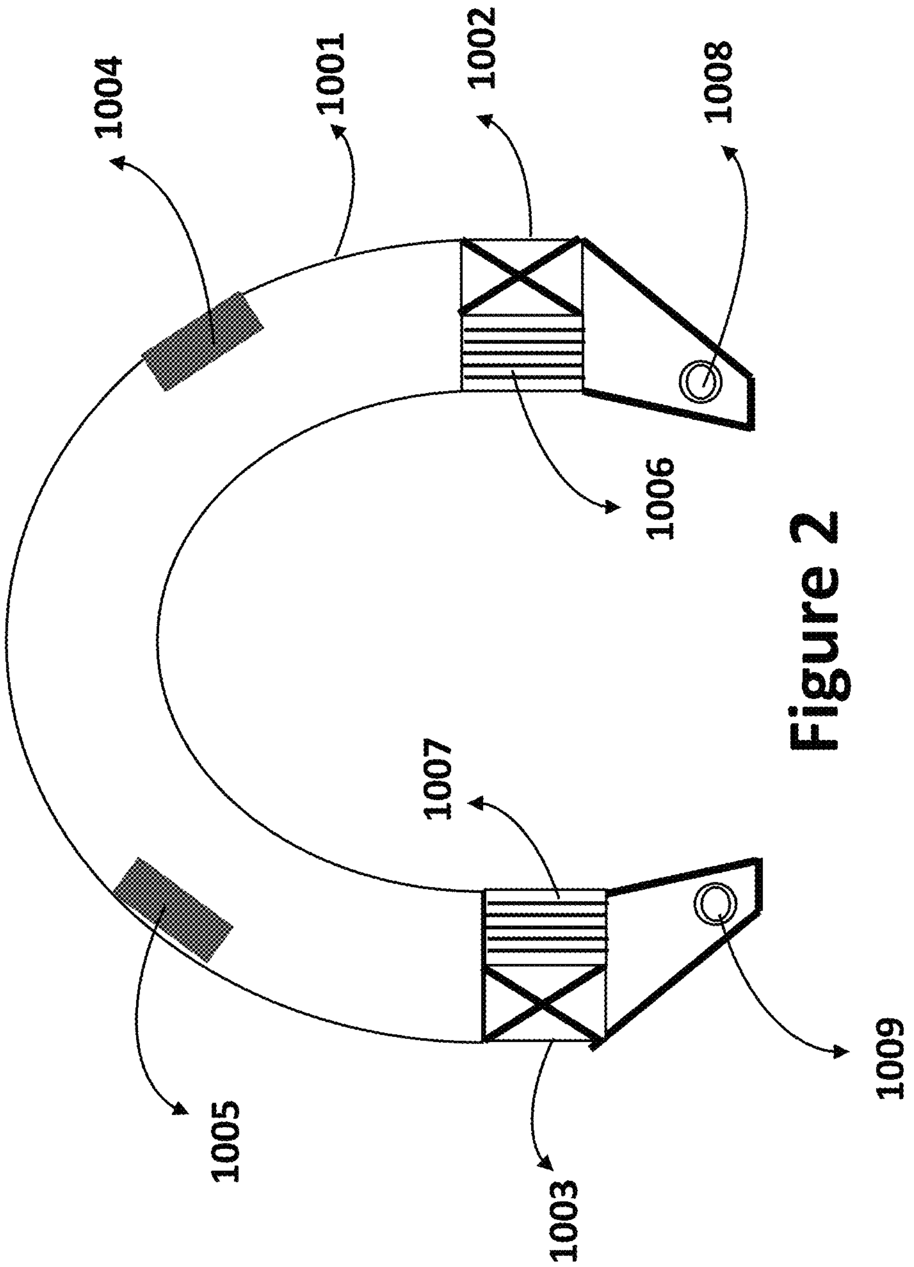
FIG. 2 illustrates a neck hanger that supplies air to the mask.

FIG. 2 depicts a neck hanger 1000. The neck hanger 1000 uses a fan 1002 to suck the air from environment, filter it with filter 1006 and send it from outlet 1008 to the interior of the face mask 951 through air pipe 953. The contaminated air from interior of face mask 951 is sent through air pipe 954 to inlet 1009 of neck hanger 1000, then filtered by filter 1007 and released into the environment by fan 1003.

The neck hanger 1000, among other things includes a flexible tube 1001, sucking fans 1002 and 1003, filters 1006 and 1007, battery housings 1004 and 1005, outlet 1008 and inlet 1009.

The flexible tube 1001 can be solid or hollow depending on application of neck hanger 1000. The flexible tube 1001 is made of very light materials to keep the overall weight of the neck hanger 1000 low. The battery housings 1004 and 1005 (it is possible to use only one housing with one battery to power both fans) accommodates the batteries that power the fans 1002 and 1003. The outlet 1008 and inlet 1009 have circular (square, or other) cross sections and provide necessary requirements to connect to air pipes 953 and 954 without any leakage of air.

The fans 1002 and 1003 both suck air from environment and the interior of the face mask 951 respectively and their sucking power is adjusted independently by controlling the DC voltage apply to them from the batteries housed in 1004 and 1005 (the control is done by a controller circuit that resides in one of the battery housings or a single housing that provides power to both fans) assigned to them. The filters 1006 and 1007 both are either high efficiency particulate air (HEPA) filter, ultra-low particulate air (ULPA) filters, or a proprietary filter based on the application of the neck hanger 1000.

There are several options for filtering the environment air and interior air of the face mask. The filtering function by filter 1006 can be performed first from environment, then the filtered air is sucked by sucking fan 1002. Another option is to suck the environment air by sucking fan 1002 first and then filter it by filter 1006. A third option is to perform the function of filtering by the air pipe 953. In other words, air pipe 953 which connects the neck hanger 952 (through connector 1008) and face mask 951 functions both as a tunnel for the flow of air from neck hanger 952 to the interior of face mask 951 and a filter (NEPA, ULPA, or proprietary). A fourth option is to have filter at two of the above explained locations (before sucking fan, after sucking fan, and air pipe). A fifth option is to have the filter at all three locations explained above (before sucking fan, after sucking fan, and air pipe). The above options also apply to air pipe 954, sucking fan 1003 and filter 1007.

Filter can perform one or more function. It can filter various type of aerosols that are harmful for breathing, droplets, particles in the air, or unpleasant smells. It is possible to add filters in various locations mentioned above to take care of aerosols, droplets, particles, and unpleasant smells. This applies to both neck hanger and head ring that will be explained in later paragraphs.

Figure 3A:
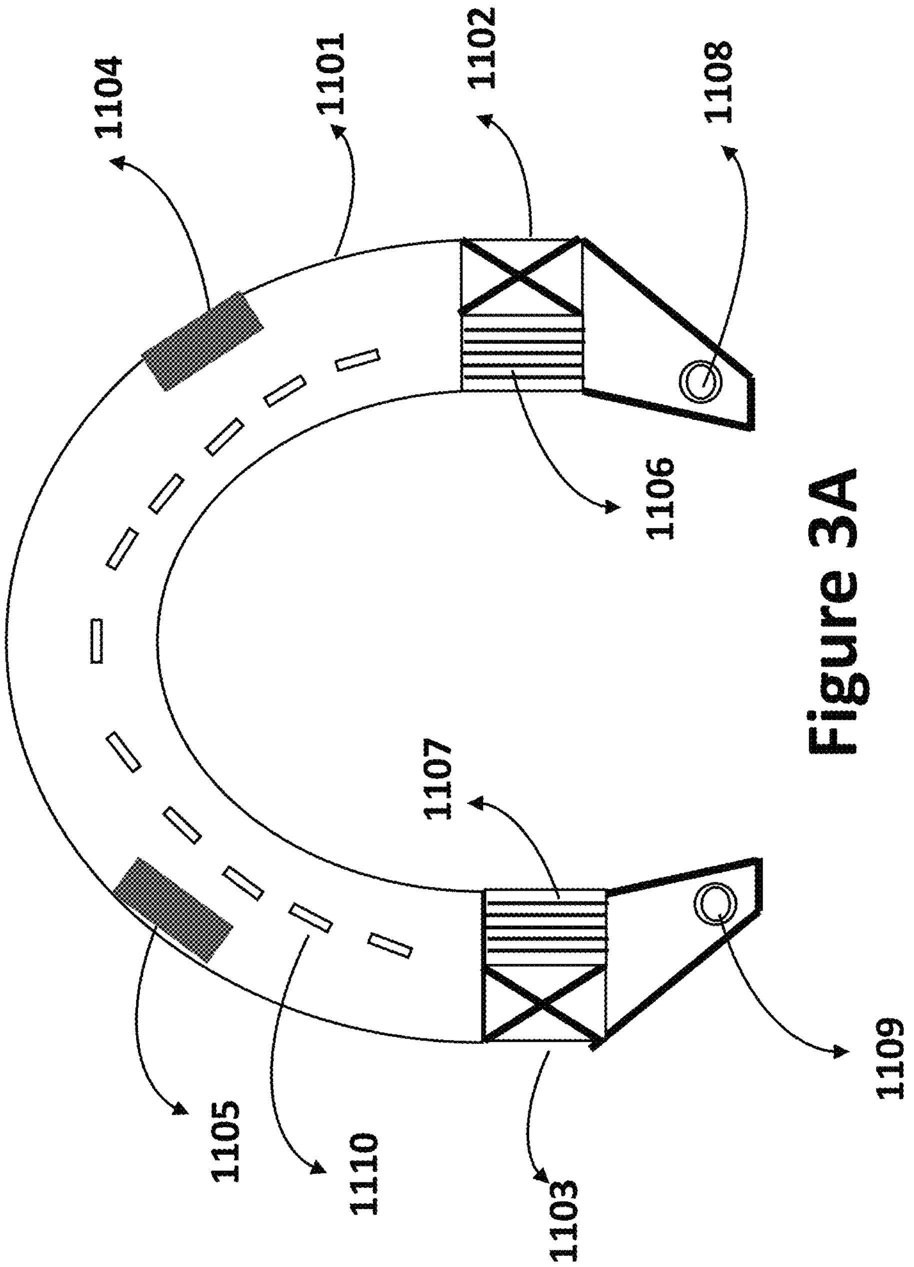
FIG. 3A illustrates a neck hanger that supplies air to the neck and cools the neck.

FIG. 3A shows a neck hanger 1100. Neck hanger 1100 in addition to facilitating flow of fresh and filtered air into the interior of the face mask 951 performs cooling of the neck (head and face) by blowing air towards the neck and head. The air sucked by fan 1102 is filtered by filter 1106 first, then a portion of the filtered air is sent into the interior of the face mask 951 from outlet 1108 through air pipe 953 and the remaining of the filtered air through apertures or holes 1110 is blown towards the neck and the head. The speed of the air flow from the apertures 1110 can be adjusted by reducing the opening area of the apertures or by totally closing a selected number of apertures 1110.

Contaminated air from the interior of face mask 951 is sucked by fan 1103 from inlet 1109 through air pipe 954, filtered by filter 1107, then sent to the apertures 1110 for blowing towards the neck and the head. Fan 1103 in addition to the contaminated air it sucks from the interior of the mask through air pipe 954 and inlet 1109 may also suck air from environment through a separate inlet on the neck hanger tube 1101 to increase the amount of the air that is blown towards neck and head through apertures 1110.

The neck hanger 1100, among other things includes a flexible tube 1101, sucking fans 1102 and 1103, filters 1106 and 1107, battery and controller housings 1104 and 1105 (it is possible to use one housing with one battery and control circuit for both fans and other functions), outlet 1108, aperture 1110, inlet 1109 and possible additional inlet for sucking the environment air by fan 1103.

The flexible tube 1101 can be solid or hollow depending on application of neck hanger 1100. The flexible tube 1101 is made of very light materials to keep the overall weight of the neck hanger 1100 low. The tube 1101 has either a U-shape, a horseshoe shape, or a proprietary shape. The battery housings 1104 and 1105 accommodate the batteries (and a controller circuit) that power the fans 1102 and 1103. The outlet 1108 and inlet 1109 have circular (square, or other) cross sections and provide necessary requirements to connect to air pipes 953 and 954 without any leakage of air. Additional inlet also can be provided on the flexible pipe 1101 to be used by fan 1103 to suck extra air from the environment. The tube 1101 can have a key on its external surface for turning on and off the operation of the neck hanger 1100. The neck hanger 1100 can also have a reset bottom on the external surface of the tube 1101 to reset the controller circuit.

The flexible tube 1101 is hollow and made of very light materials (like plastic, fiber glass, aluminum, etc.) to keep the overall weight of the neck hanger 1101 low. The battery housings 1104 and 1105 accommodate the batteries (and a controller circuit) that power the fans 1102 and 1103. The DC voltage from batteries applied to fans are independently adjusted by two (or one controller) controllers that are housed in neck hanger 1100. The outlet 1108 and inlet 1109 have circular cross sections and provide necessary requirements to connect to air pipes 953 and 954 without any leakage of air to the environment.

Figure 3B:
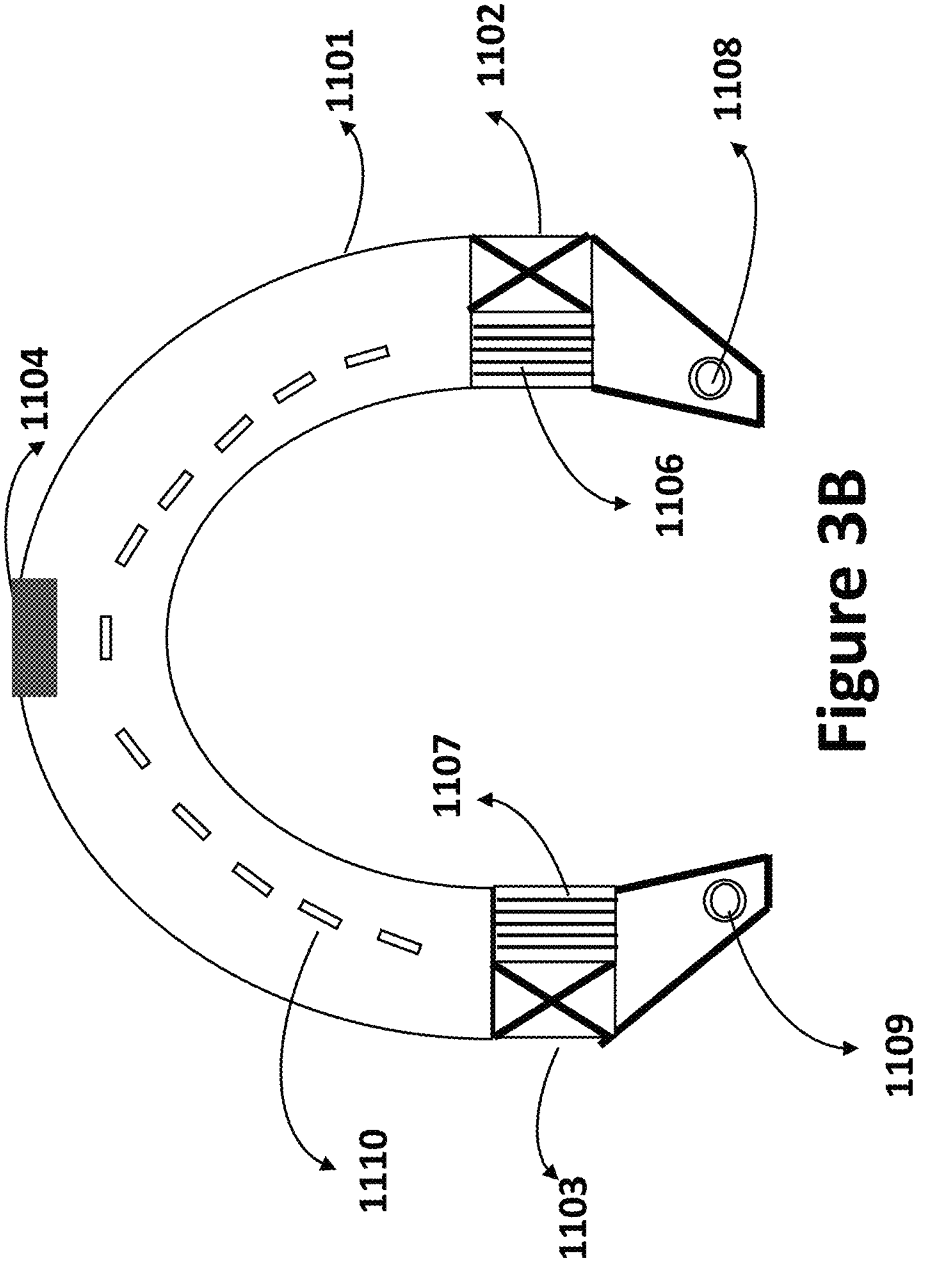
FIG. 3B illustrates a neck hanger that supplies air to the neck and cools the neck with a single housing for battery and controller.
Figure 4A:
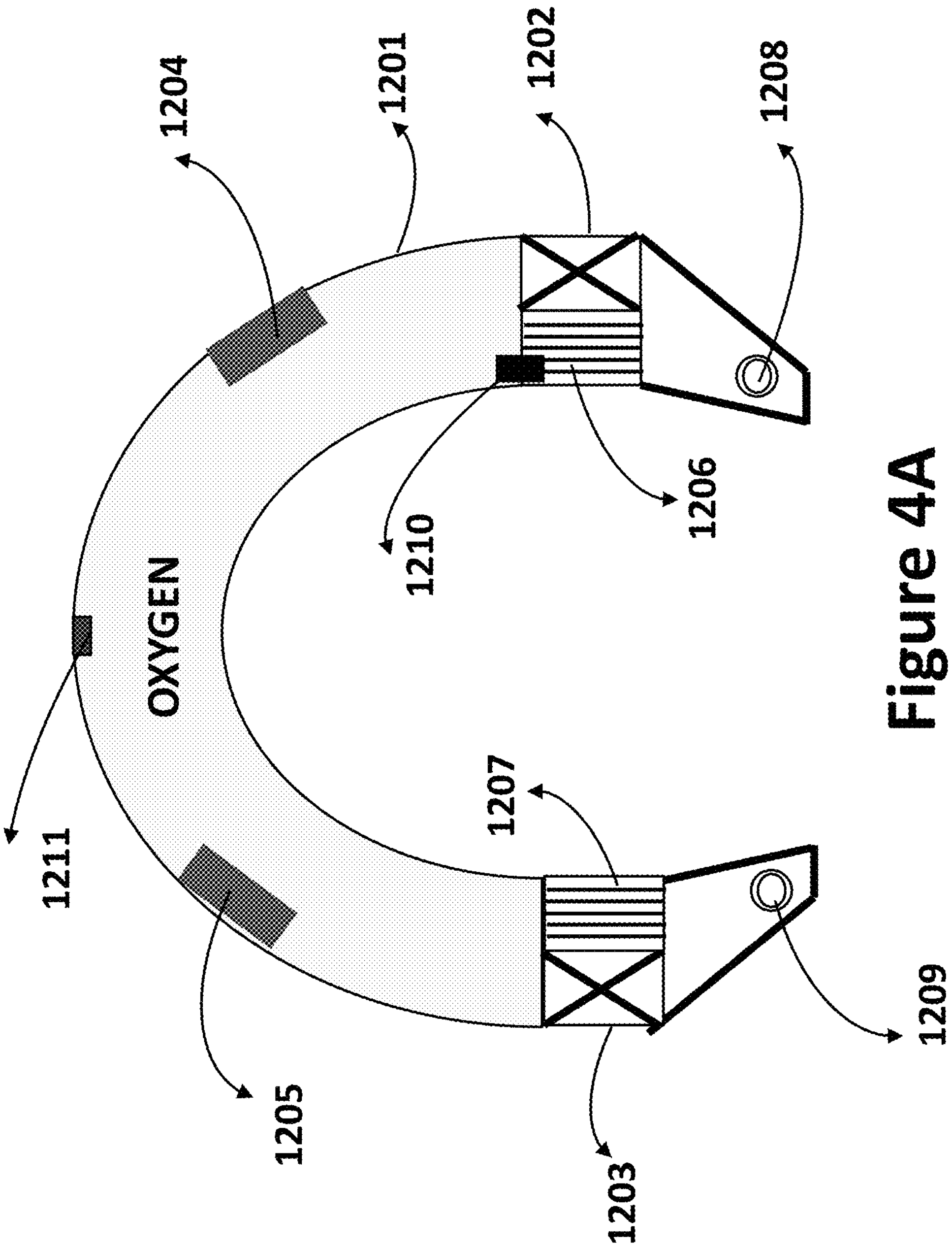
FIG. 4A illustrates a neck hanger that supplies air and purified oxygen to the mask.

FIG. 3B shows the neck hanger 1100 when only one housing 1104 is used for the battery that powers the fans, LED, sensors, controller circuit electronics, and any moving components that requires power. The housing in addition to the battery also houses the controller circuit electronics. The housing has an USB port or other ports for charging the batteries and communication of controller with external device, FIG. 4A illustrates neck hanger 1200. Neck hanger 1200 in addition to the functions that neck hanger 1000 performs is also an oxygen tank for purified oxygen. Neck hanger 1200 facilitates flow of fresh and filtered air that is mixed with purified oxygen from the oxygen tank inside the face mask 951. The air sucked by fan 1202 is filtered by filter 1206 and mixed with injected purified oxygen from injector 1210 before flowing into the interior of the face mask 951 from outlet 1208 and through air pipe 953. Contaminated air from the interior of the face mask 951 is sucked by fan 1203 through air pipe 954 and inlet 1209 then filtered by filter 1207 and released to the environment.

The neck hanger 1200, among other things includes a flexible or solid oxygen tank 1201, sucking fans 1202 and 1203, filters 1206 and 1207, battery housings 1204 and 1205, outlet 1208, inlet 1209, oxygen injection port 1210 and oxygen refill port 1211.

The solid (flexible) circular (square or other shapes) oxygen tank 1201 houses purified oxygen for mixing with filtered fresh air from the environment. The flexible or solid circular (square or others) oxygen tank 1201 is made of very light materials to keep the overall weight of the neck hanger 1200 low. The battery housings 1204 and 1205 accommodates the batteries that power the fans 1202 and 1203. The outlet 1208 and inlet 1209 have circular (square or others) cross sections and provide necessary requirements to connect to air pipes 953 and 954 without any leakage of air. The sucked air from environment by fan 1202 is first filtered by HEPA, ULPA filter, or proprietary filter 1206 then mixed with the purified oxygen from oxygen tank through injection port 1210 before flowing into the interior of the mask 951 through outlet 2108 and air pipe 953. The oxygen tank is refilled through refill port 1211.

The injection port 1210 is controlled to inject oxygen continuously or as needed. When oxygen is injected continuously it can be controlled to inject the amount of oxygen that is needed and the person wearing face mask 951 feels comfortable. The oxygen also can be injected as needed. This is down in two ways. First way is to have a controller that injects the oxygen in a controlled interval by opening the injection port 1210 for a controlled time window and then close the injection port 1210. The interval between two injection time windows is also controlled. Therefore, the injection port 1210 opens for a time window and closes for an interval of time and again opens for a time window. Both open time window and closed interval between two openings of injection port 1210 is controlled by a controller. This way oxygen tank last longer.

The second method is opening the injection port 1210 manually as needed. The person wearing face mask with neck hanger 950 decides when there is a need for extra oxygen and opens the injection port 1210 for a defined time window. The time window can be different each time it is opened manually.

Figure 4B:
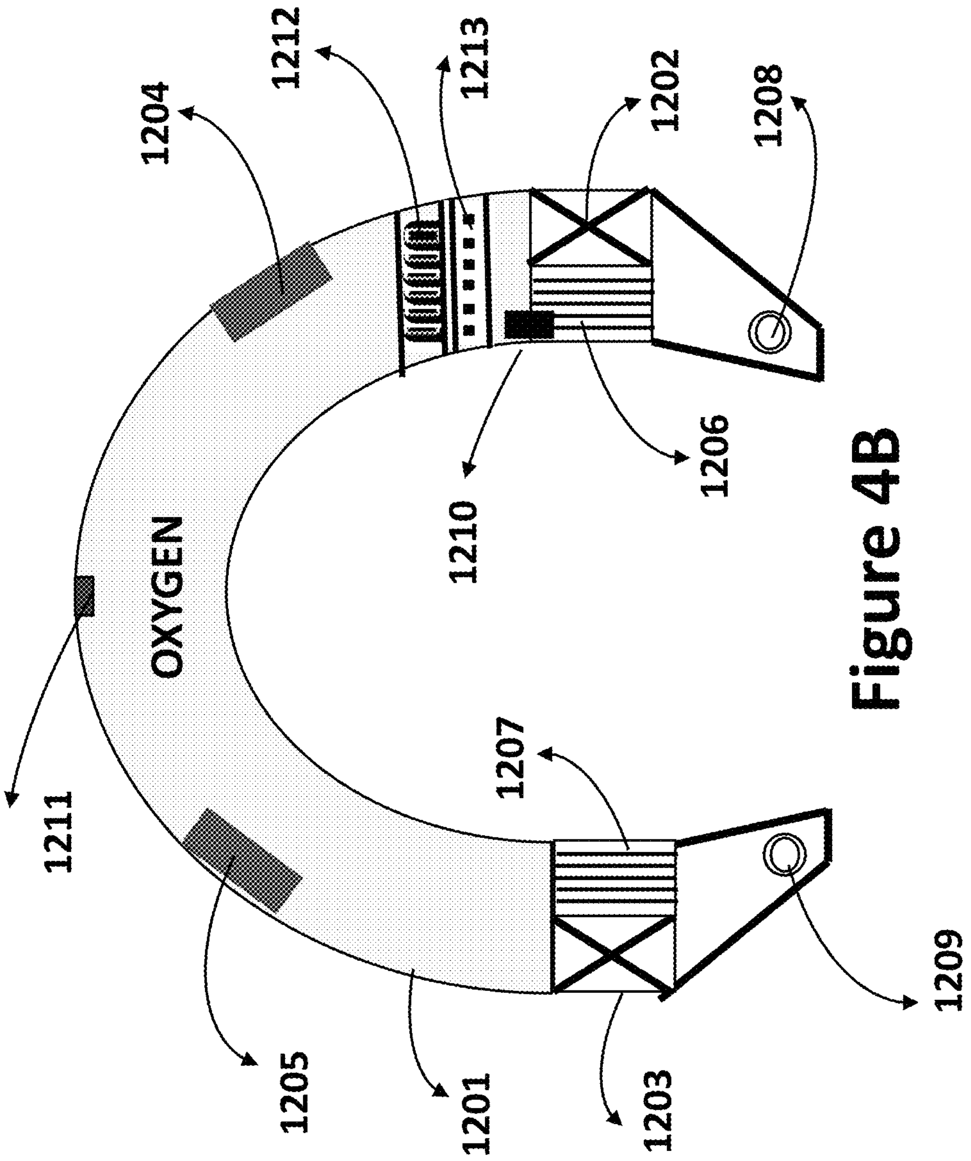
FIG. 4B depicts a neck hanger with a regulator.

FIG. 4B depicts neck hanger 1200 with a regulator. The regulator consists of pressure reducer 1112 and a flow adjuster 1113. These two components 1112 and 1113 are adjusted mechanically by rotating them or by other means. The oxygen tank can be a tank within the neck hanger tube 1201. The entire of neck hanger 1201 or a portion of it can also be used as oxygen tank. It all depends on several parameters which are safety issues, weight, pressure of compressed oxygen (in any form, gas, solid or liquid), and complexity. The regulator should also function as a pressure gauge and a flow meter. One way of providing these two functions is to use sensors one as pressure sensor and another as flow sensor. The other approach is to have provisions for a pressure gauge or flow meter to be connected to the regulator when needed like a valve that is used to refill the oxygen tank.

The sensors measure the pressure and the flow of the oxygen and send the information to a controller circuit that is in the battery or power housing. The neck hanger can have a single housing for a single battery to power both sucking fans 1202 and 1203. The speed of the fans is controlled by the controller by changing the DC (direct current) voltage applied to the sucking fans 1202 and 1203. The power housing for battery and controller can have a USB port or other power ports for charging the battery. The USB port is also used for communication between controller circuit and external devices. The controller circuit can also use a wireless transceiver like Bluetooth, Zigbee, Infrared, or WiFi (wireless fidelity) to communicate with external devices.

The controller circuit within the power housing performs several tasks. One of the tasks is to control the speed of the fans by changing the DC voltage applied to the fans. The controller based on the information it obtains from various sensors (in the air pipes, inside the mask) decides what voltage to apply to the sucking fans 1202 and 1203. The decision is made by an artificial intelligence (AI) algorithm that is executed in the controller's CPU (central processing unit). A second task is to monitor the amount of charge of the batteries through appropriate sensors and use an LED (light emission diode) which is capable of deeming, a red LED when the charge is below a threshold, or communication to an external device like smart phone the amount of available charge. A third task is to monitor the pressure of oxygen tank and estimate the amount oxygen in the tank and indicate when the tank needs to be refilled through a red LED or communicating with an external device. A fourth task is to act as a flow meter for the regulator flow adjuster 1213 using a sensor that measures the oxygen flow. If the oxygen flow is below a threshold, then the controller indicates through an LED light or communicate to an external device. A fifth task is to connect to an external device and configure the mask with neck hanger 950. The configurations parameters are initial operating parameters of the mask with neck hanger 950 that include various thresholds, and settings. Another task of controller is to perform diagnostic and alarms.

Figure 5:
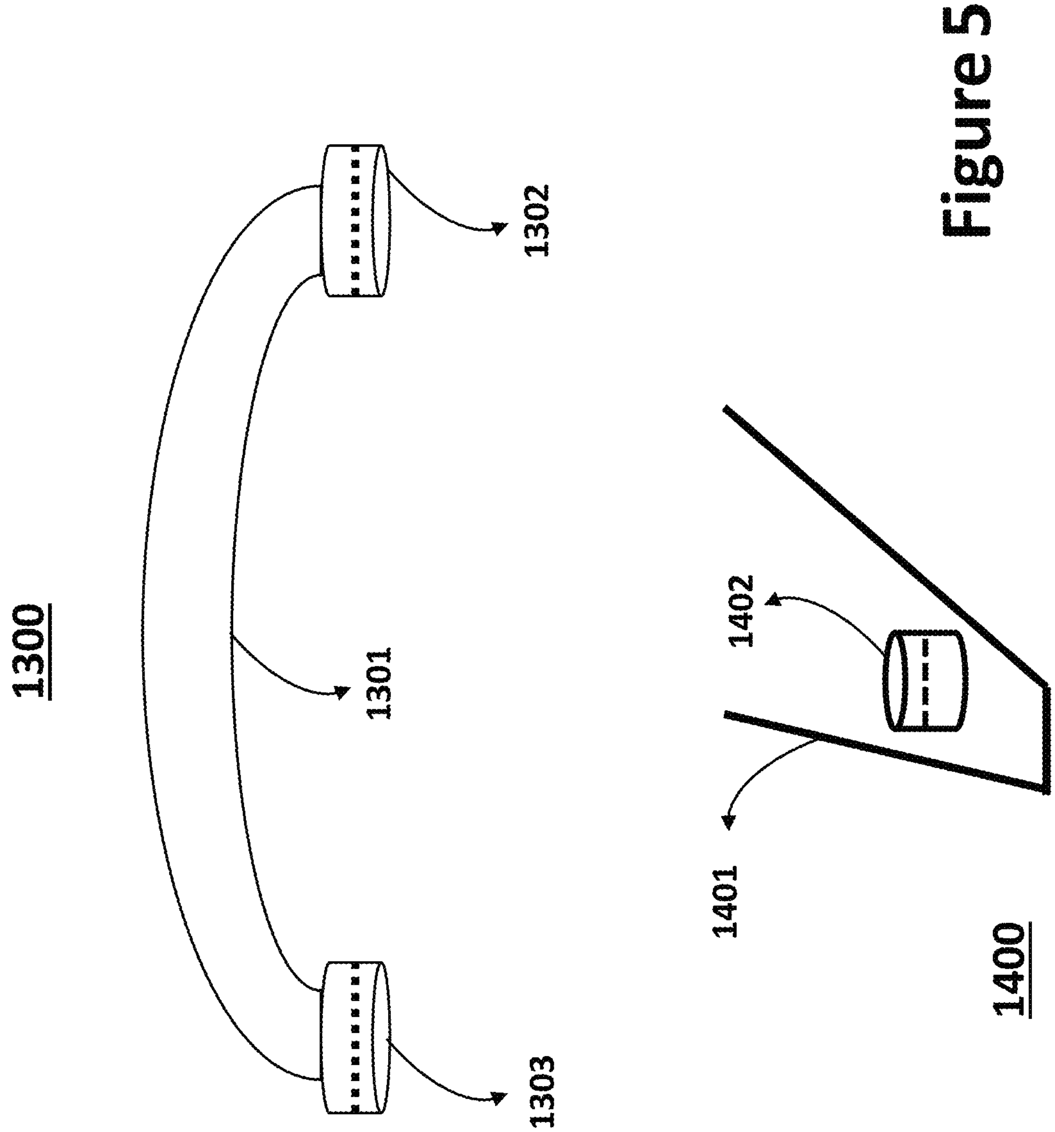
FIG. 5 illustrates the pipe that carries air to the mask and its connection port to neck hanger.

FIG. 5 shows flexible air pipe 1300 and outlet or inlet of neck hanger 1400. Flexible air pipe 1300 comprises of air pipe 1301 and female heads 1302 and 1303. Female heads 1302 and 1303 are used to connect the flexible pipe 1300 to face mask 951 and neck hanger 952. Neck hanger 1401 has the male head 1402 for the female head 1302 of air pipe 1301.

There are various methods of connecting the air pipe 1301 to the neck hanger 1401. Flexible pipe fittings are available in a variety of shapes and materials. Some of these methods are:

a) Push fitting
b) Press fitting
c) Telescopic tube fitting
d) Telescopic tube lock
e) Telescoping clamp
f) Telescoping tube pushing
g) Telescopic tube by quick connect
h) Using threaded male and female heads Female head 1303 of the flexible (or solid) pipe 1301 is for connecting to face mask 951. Female head 1303 can be different from female head 1302 due to its connection to the mask. Instead of female head it is possible to use a male head for 1303 and have the female head on the face mask 951. The same can be applied to head 1302, use male head for 1302 and have the female head on the neck hanger 1401.

The air pipe 1300 is flexible and its length changes when head of the person wearing the mask with neck hanger moves left, right, down, and up. The air pipe expands like expandable hose when there is a need. The flexible pipe 1300 expands when the head moves and shrinks to its original length when head returns.

Figure 6A:
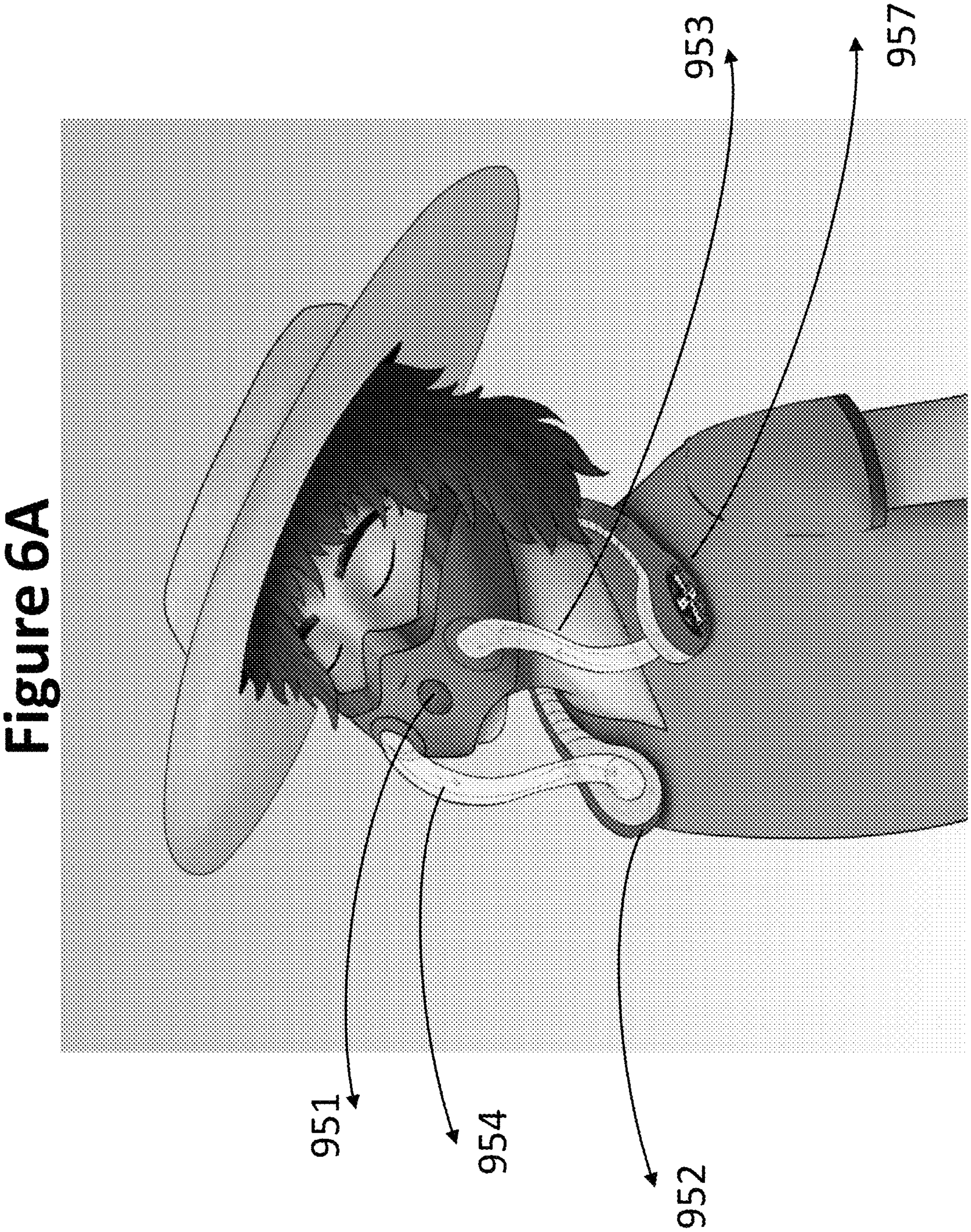
FIG. 6A shows a typical industrial design for the face mask with neck hanger.

FIG. 6A depicts a typical industrial design for novel face mask with a neck hanger 950. This figure shows one implementation of neck hanger 952 with fans located at either end whether a "U" shape, horseshoe shape, or proprietary shape is used. The neck hanger 952 may be flexible and person who wears it being able to adjust it for comfort. The air pipes 953 and 954 are also flexible to allow easy connection to the mask 951 and neck hanger 952 and provide a comfortable feeling for the person who wears the face mask with a neck hanger 950. The flow of the air is from air pipe 953 to air pipe 954 through the interior of the mask 951. This flow of the air will not be disturbed due to the direction the sucking fans suck the air and blow the air.

Figure 6B:
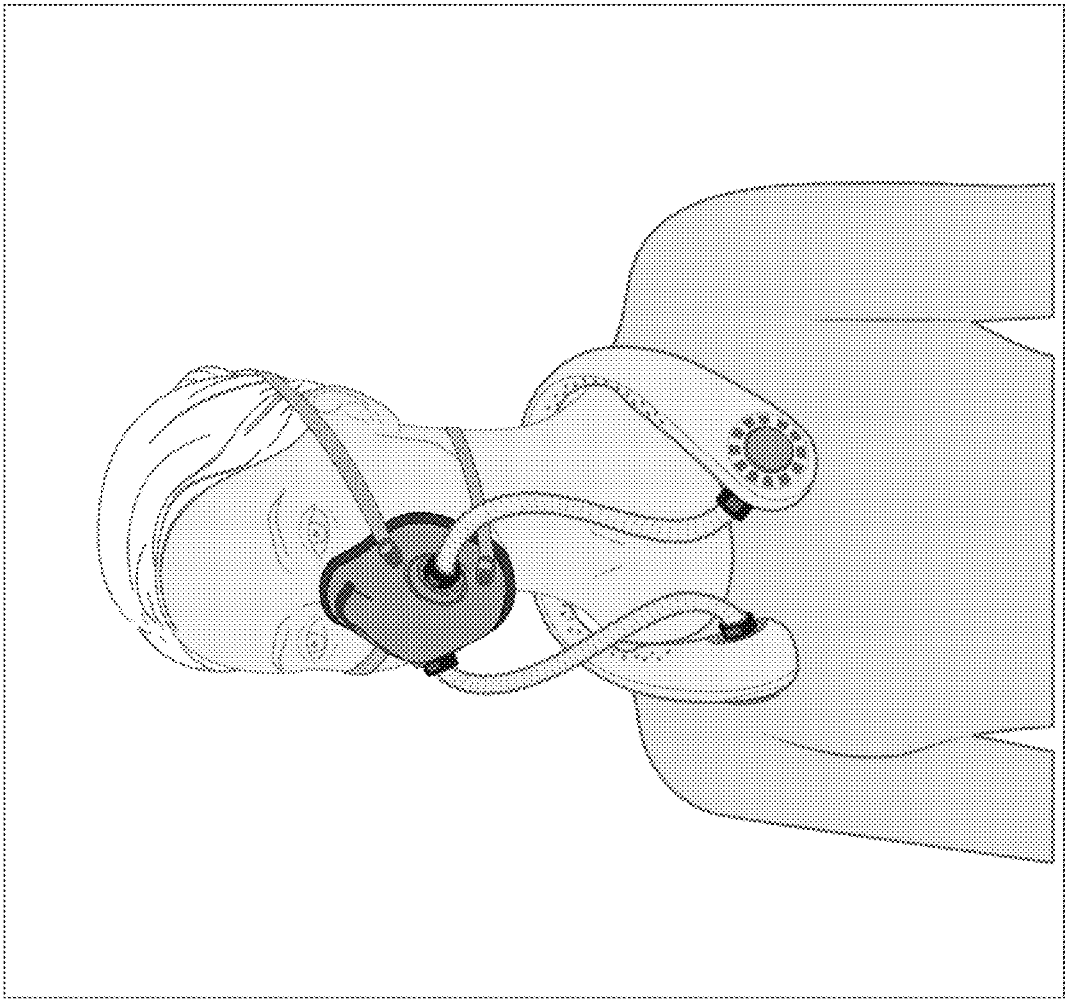
FIG. 6B illustrates how a face mask with a neck hanger is worn by a person.
Figure 6C:
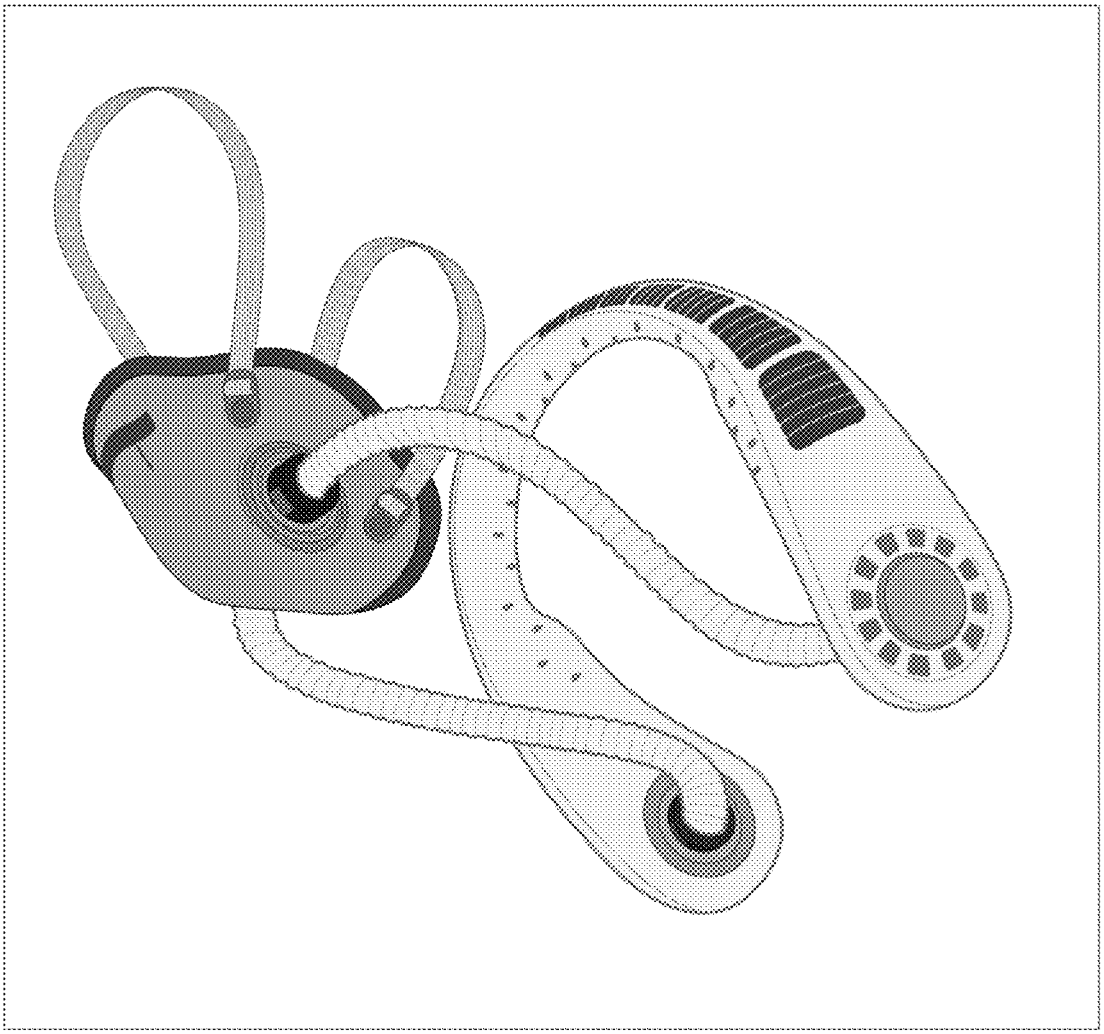
FIG. 6C depicts various components of a face mask with a neck hanger.
Figure 6D:
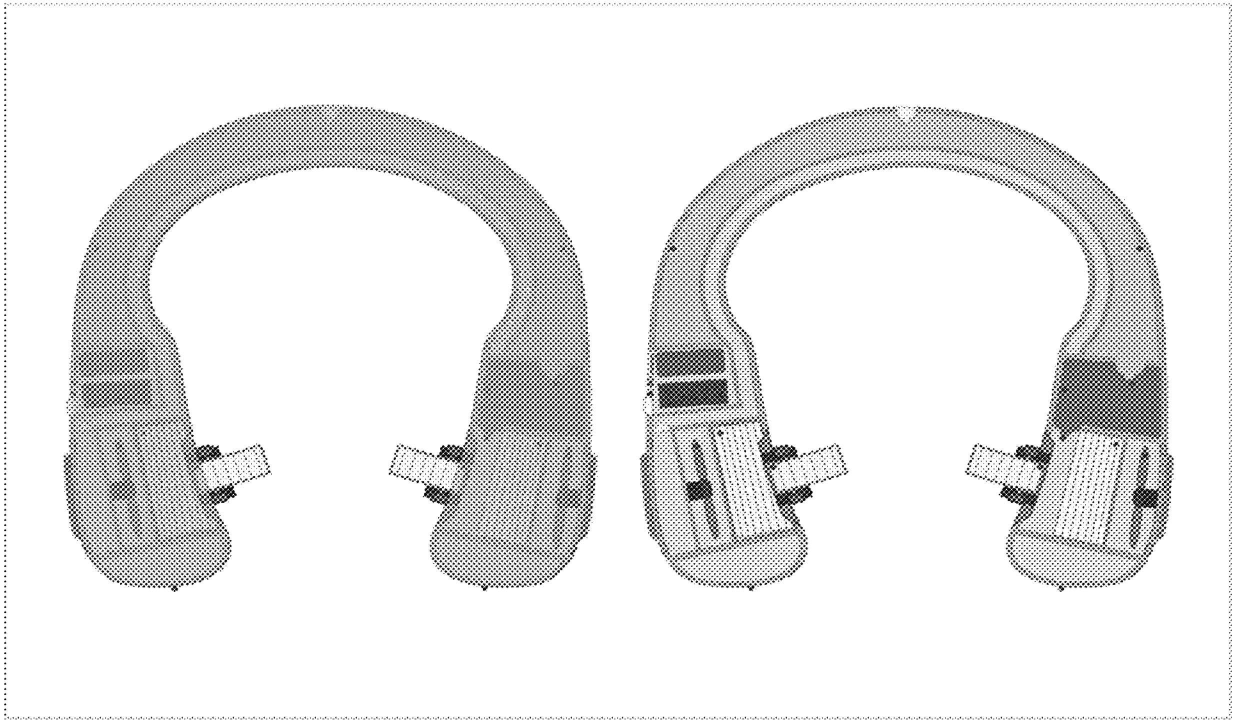
FIG. 6D shows the cross-section views of the neck hanger

FIG. 6B shows how the face mask with neck hanger is worn by a person. It shows how the mask is attached to the face and how the air pipes are connected to the mask and neck hanger. FIG. 6C shows the face mask with neck hanger with all the components. It also shows where the mini solar cells are connected and where the coiling apertures or holes are located. FIG. 6D depicts the cross-section views of the neck hanger 1200.

Figure 6E:
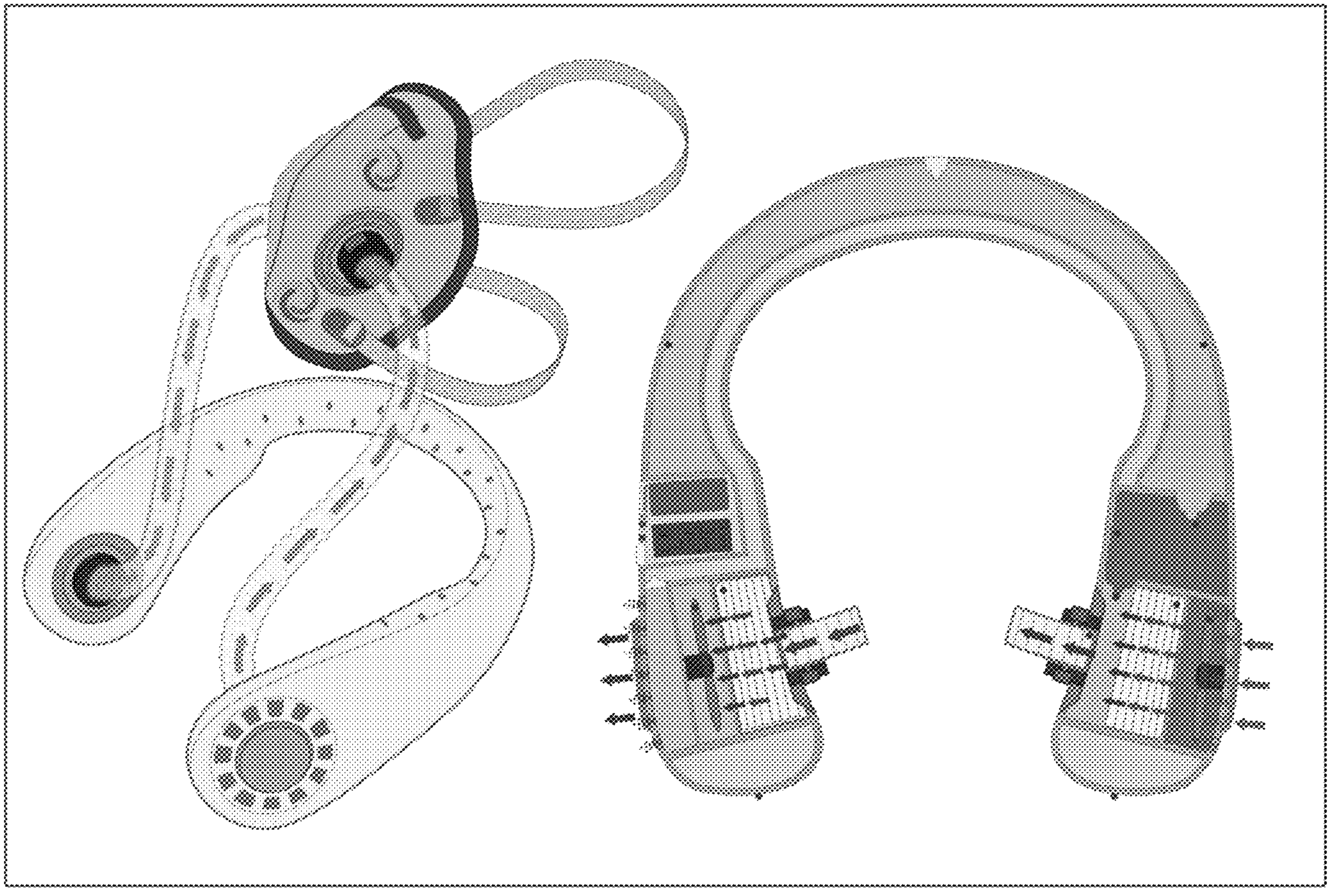
FIG. 6E illustrates the direction of air flow within the neck hanger, air pipes and the mask.

FIG. 6E illustrates the direction of air flow within the neck hanger, air pipes and the mask. The air from the environment that is contaminated is sucked by fan 1002, filtered by filter 1006 and then clean air is blown into the interior of the mask through air pipe 953. The clean air inside the mask becomes contaminated due to exhaling of the person wearing the mask, then the contaminated air is sucked out of the interior of the mask by fan 1003 through air pipe 954, filtered by filter 1007 and then clean air is released back to the environment.

Figure 6F:
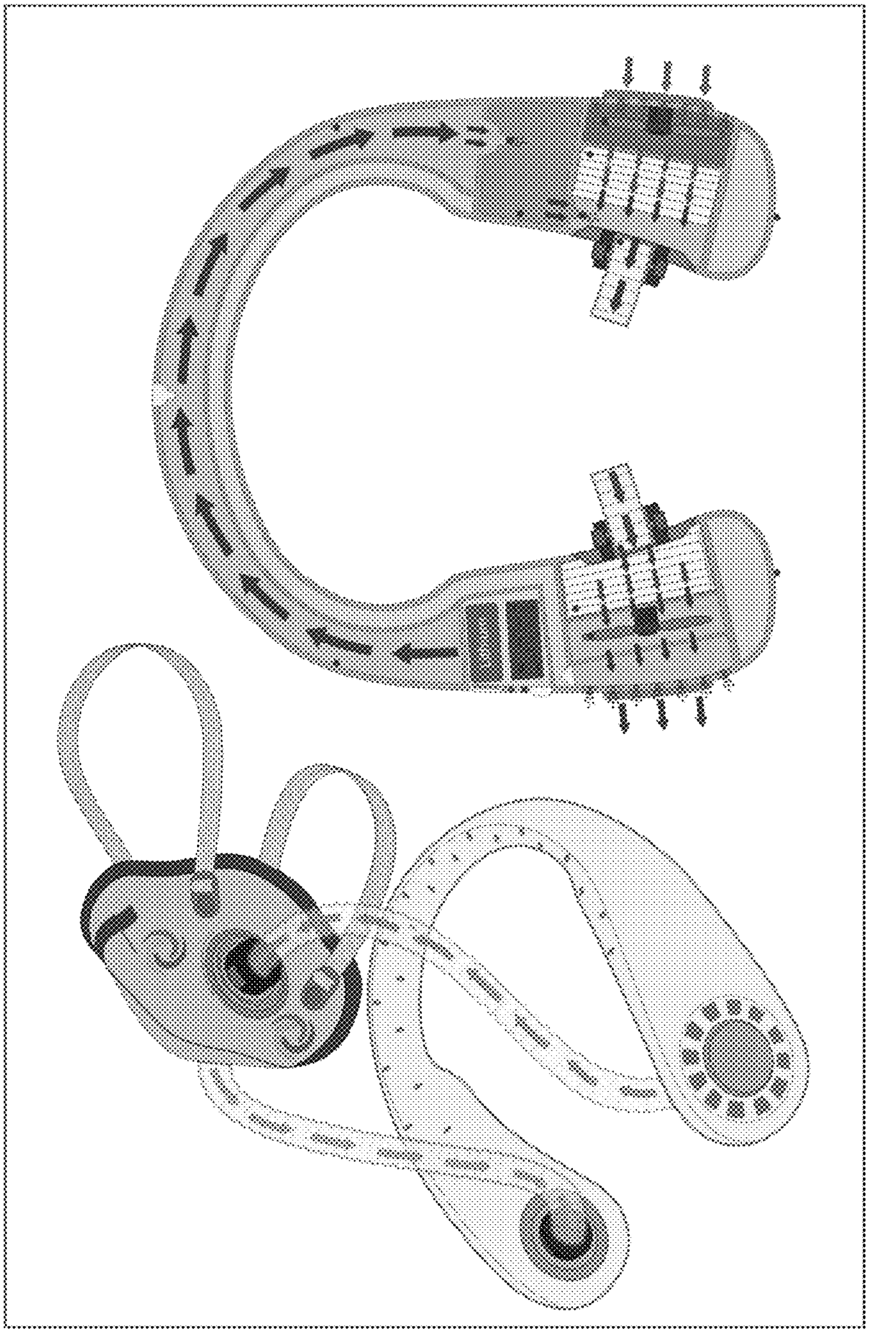
FIG. 6F depicts the airflow within the neck hanger when oxygen is mixed to the air that is flow into the interior of the mask

FIG. 6F depicts how oxygen is added to the air that is sent into the interior of the mask. The contaminated air from the environment is sucked by fan 1002, filtered and cleaned by filter 1006, then purified oxygen is added to the clean air and then mix of clean air and purified oxygen is sent into the interior of the mask through air pipe 953. The clean air inside the interior of the mask becomes contaminated due to exhaling of the person wearing the mask, then the contaminated air is sucked out of the interior of the mask by fan 1003 through air pipe 954, filtered by filter 1007 and clean air is released back to the environment.

Figure 6G:
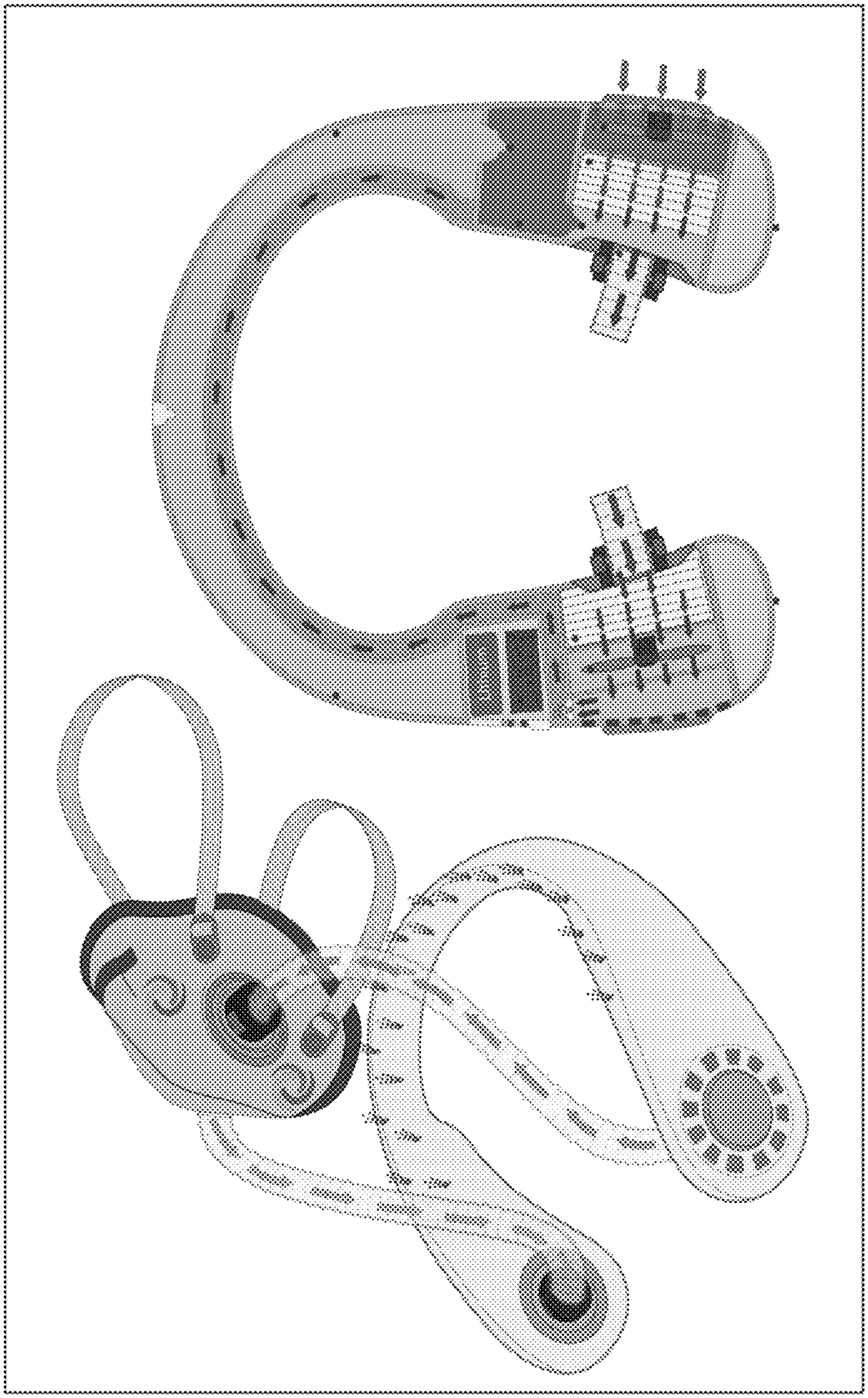
FIG. 6G shows the direction of air flow when the neck hanger is used to cool the neck and head.

FIG. 6G shows how the cleaned interior air of the mask is used for cooling the neck and head. The contaminated air from interior of the mask is sucked through air pipe 954, filtered by filter 1007, then blown out towards the neck and head through apertures or holes 1110.

Figure 6H:
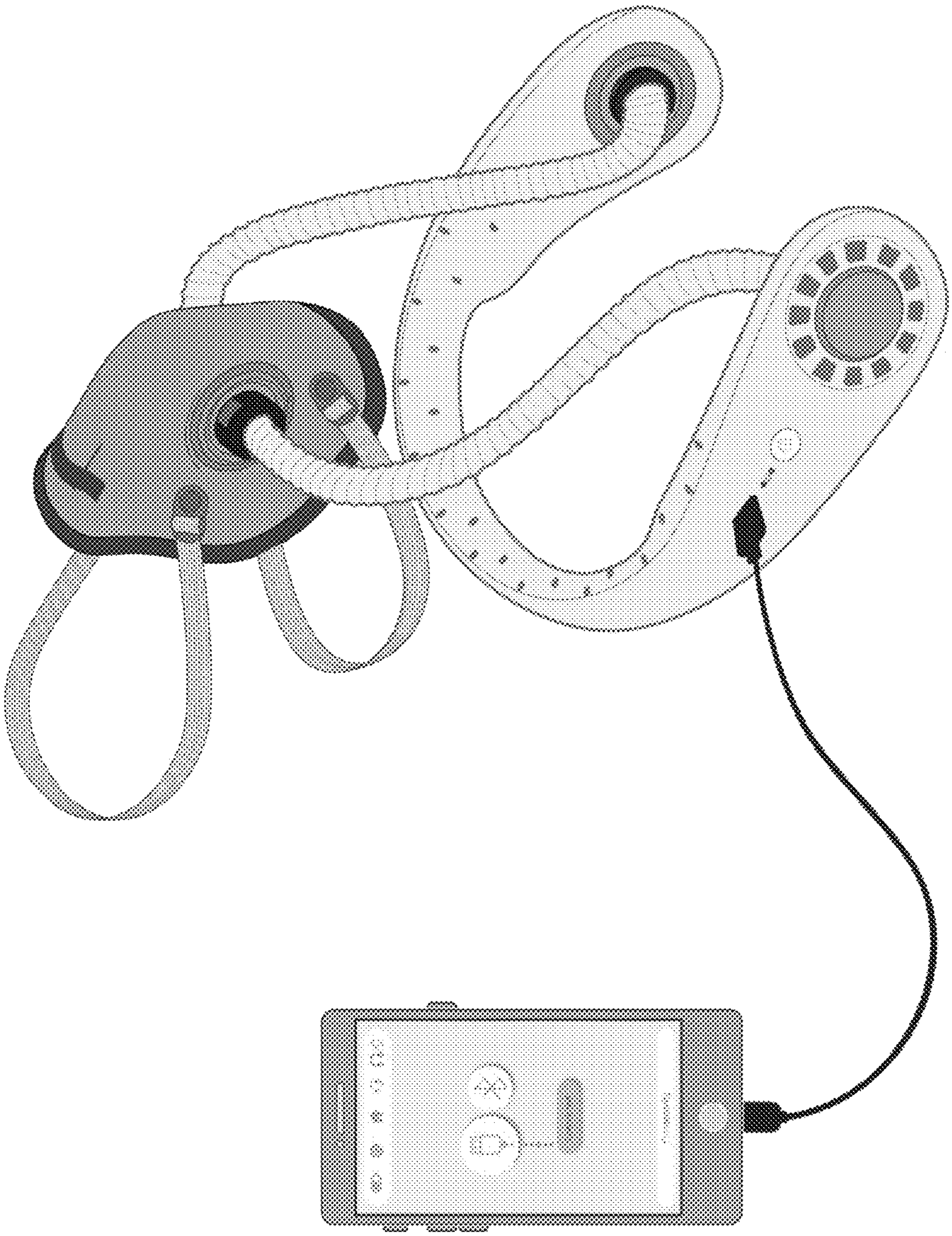
FIG. 6H illustrate connection of the mask with neck hanger to an external device using a USB cable.

FIG. 6H illustrates communication of mask with neck hanger 950 with an external device using a USB cable. The USB cable end ports can be different for the external device. Neck hanger uses the USB end of the cable but the end that is connected to the device can be a proprietary port specific to the external device.

Figure 6I:
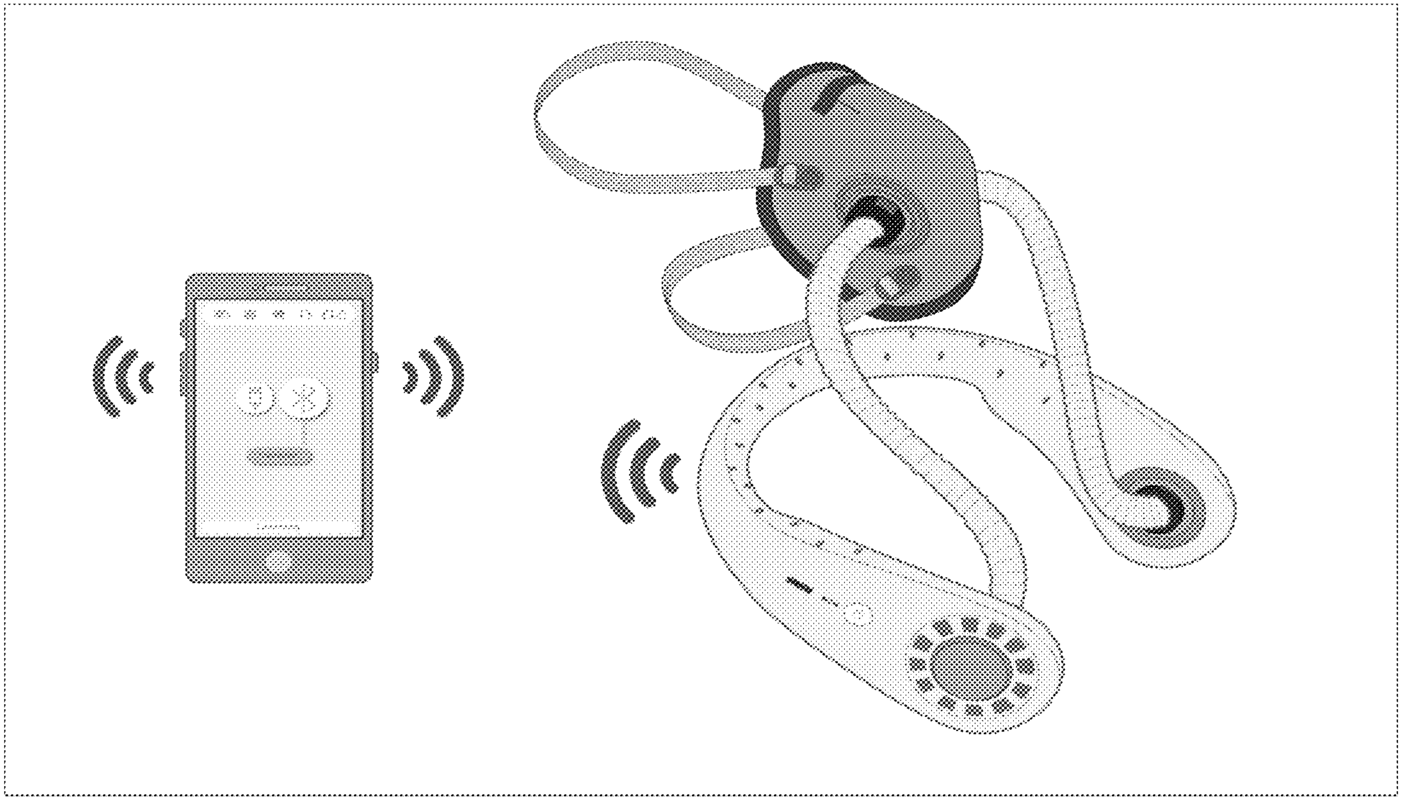
FIG. 6I depicts connection of the mask with neck hanger to an external device using wireless transceiver.

FIG. 6I depicts communication of mask with neck hanger 950 with an external device using a wireless transceiver. The wireless transceiver can be WiFi (wireless fidelity), Bluetooth, Zigbee, Infrared, 5G, 6G, and beyond 5G/6G. The mask with neck hanger 950 can act as an IoT (Internet of things) device and uses 5G, 6G, or beyond 5G/6G to communicate with another device through IoT network (5G, 6G, or beyond 5G/6G). In both methods (FIGS. 6H and 6I) the external device is used for diagnostic, alarm, control, status, and configuration.

Figure 6J:
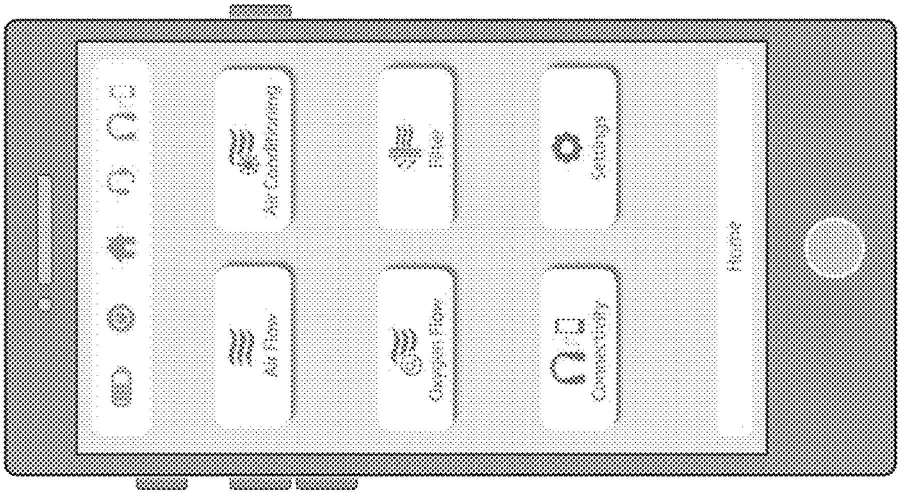
FIG. 6J shows home page of an application on the external device's screen.

FIG. 6J shows the home page of an application used by an external device to perform configuration settings, observe the status of the operation of the mask with neck hanger 950, perform diagnostics, and receive alarm due to any failure or malfunction.

Figure 6K:
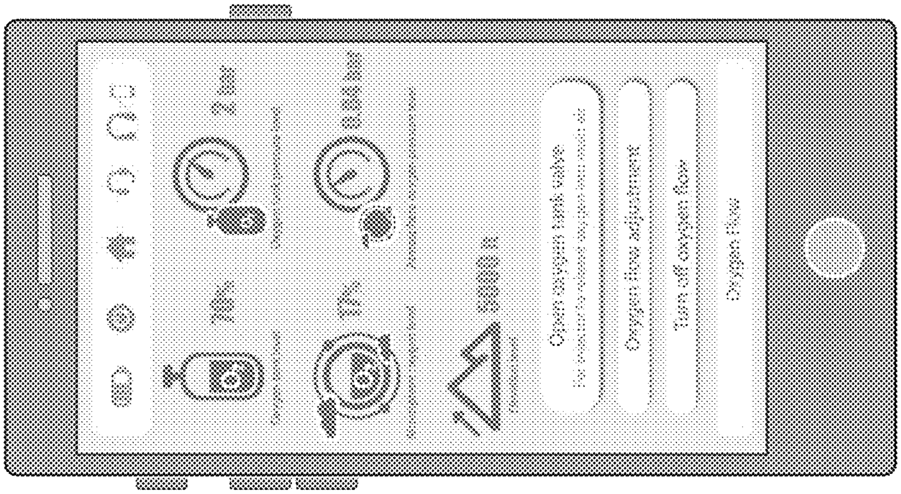
FIG. 6K illustrate the page of the applicated which shows status of oxygen tank.

FIG. 6K depicts a page of the application which shows the status of the oxygen tank. It can show the amount of oxygen used, the amount of oxygen left, elevation level, atmosphere oxygen level, atmosphere pressure level, tank oxygen pressure level, and other instructions.

Figure 7:
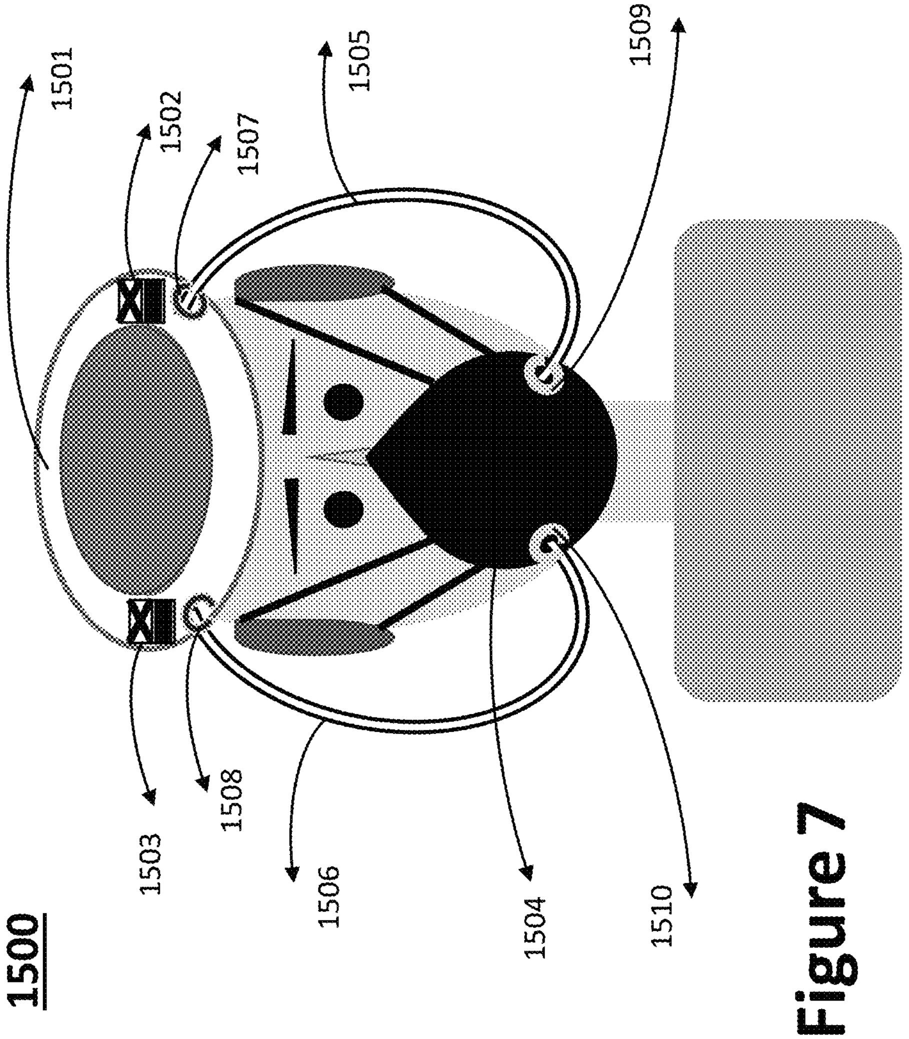
FIG. 7 illustrates a face mask with a head ring.

FIG. 7 depicts a novel face mask with a head ring 1500. The face mask with a head ring 1500 comprises of a typical face mask 1504, an air pipe 1505 that receives air from a head ring 1501 using sucking fan 1502 and inject it into the interior of the face mask 1504, an air pipe 1506 that receives contaminated air from interior of the mask 1504 and delivers it into head ring 1501. Air pipes 1505 and 1506 are attached to the face mask 1504 through connectors 1509 and 1510. Fresh air is sucked from free space by head ring 1501 using sucking fan 1502 (which has a HEPA, a ULPA filter, or a proprietary filter attached to it) and delivered to the interior of the face mask 1504 using the air pipe 1505 that is connected to both head ring 1501 and face mask 1504. Contaminated air from interior of face mask 1504 is received by air pipe 1506 that is connected to both face mask 1504 and head ring 1501 and delivered into head ring 1501 to be sucked by fan 1503 (which has a HEPA, a ULPA filter, or a proprietary filter attached to it) and released to free space. The air pipes 1505 and 1506 may be part of head ring 1501 or face mask 1504.

i) In one embodiment, the head ring 1501 is also used as a neck and/or face cooler by blowing some of the air it sucks by fan 1502 from free space towards the face and neck.

j) In one embodiment, the head ring 1501 is used as a neck and/or face cooler by blowing the filtered contaminated air sucked by fan 1503 from the interior of the face mask 1504 towards the neck and face.

k) In one embodiment, the head ring 1501 is used as a neck and/or face cooler by blowing some of the filtered sucked air by fan 1502 from environment and the filtered contaminated air sucked by fan 1503 from the interior of the face mask 1504 towards the neck and/or face using air apertures or opening holes on the peripheral of the head ring 1501.

l) In another embodiment, the air aperture or opening hole air flow is controlled by changing the area of opening of the aperture or hole.

m) In another embodiment, the head ring 1501 sucks the air from free space using fan 1502 and send it into the interior of the face mask 1504 without filtering.

n) In one embodiment, the head ring 1501 sucks the air from free space using fan 1502 and sends it into the interior of the face mask 1504 after being filtered.

o) In another embodiment, the head ring 1501 sucks the air from free space using fan 1502 and sends some of it into the interior of the face mask 1504 after being filtered and blow the remaining of the sucked air from free space filtered or unfiltered towards the neck and/or face for cooling.

p) In one embodiment, the air pipes 1505 and 1506 are part of the head ring 1501 and can be slide inside the head ring 1501 when not connected to the face mask 1504.

q) In one embodiment, the air pipes 1505 and 1506 are independent components and are connected to both face mask 1504 (through connectors 1509 and 1510) and head ring 1501 (through connectors 1507 and 1508) using various simple methods that prevent any air leak.

r) In another embodiment, the amount of air that is passed through face mask 1504 is controlled by various known practical methods such as speed of fan, the amount of sucked air that is used for cooling, releasing extra air, etc.

s) In another embodiment, the amount of air used by head ring 1501 for cooling the neck and/or face is controlled by various known practical methods such as opening and closing the apertures or holes that blow the air, reducing the opening of the apertures or holes, reducing fan speed, etc.

t) In one embodiment, the amount of sucked air from free space (environment) by fan 1502 and contaminated air from interior of the mask 1504 by fan 1503 is controlled and adjusted through various known practical methods such changing the DC voltage applied to the fans.

u) In another embodiment, head ring 1501 uses fan 1503 to suck the contaminated air from interior of the face mask 1504 through air pipe 1506 as well as some air from free space to use for cooling the neck and/or face through apertures or opening holes on the peripheral of the head ring 1501.

v) In one embodiment, the head ring 1501 stores purified oxygen inside the head ring 1501 and through an injection aperture mixes controlled amount of the purified oxygen with filtered or unfiltered air sucked from free space by fan 1502 before sending the mixed air through air pipe 1505 into the face mask 1504.

w) In another embodiment, the amount of purified oxygen that mixes with sucked and filtered or unfiltered air from free space is controlled for different applications.

x) In one embodiment, the novel face mask with head ring 1500 is used for various applications when body needs air with required oxygen level. These applications are people with asthma, high elevation hikers, hospital patients, nurses, doctors, miners, gliders, people with breathing problem, people with heart problem, people with medical problems that need higher level oxygen, skiers at high elevations, ordinary people in areas with high level of air pollution (cities), fire fighters, tourist in high elevation places, factory workers, carpenters, chemical lab workers, airplane passengers, and any other application that requires a face mask.

Figure 8A:
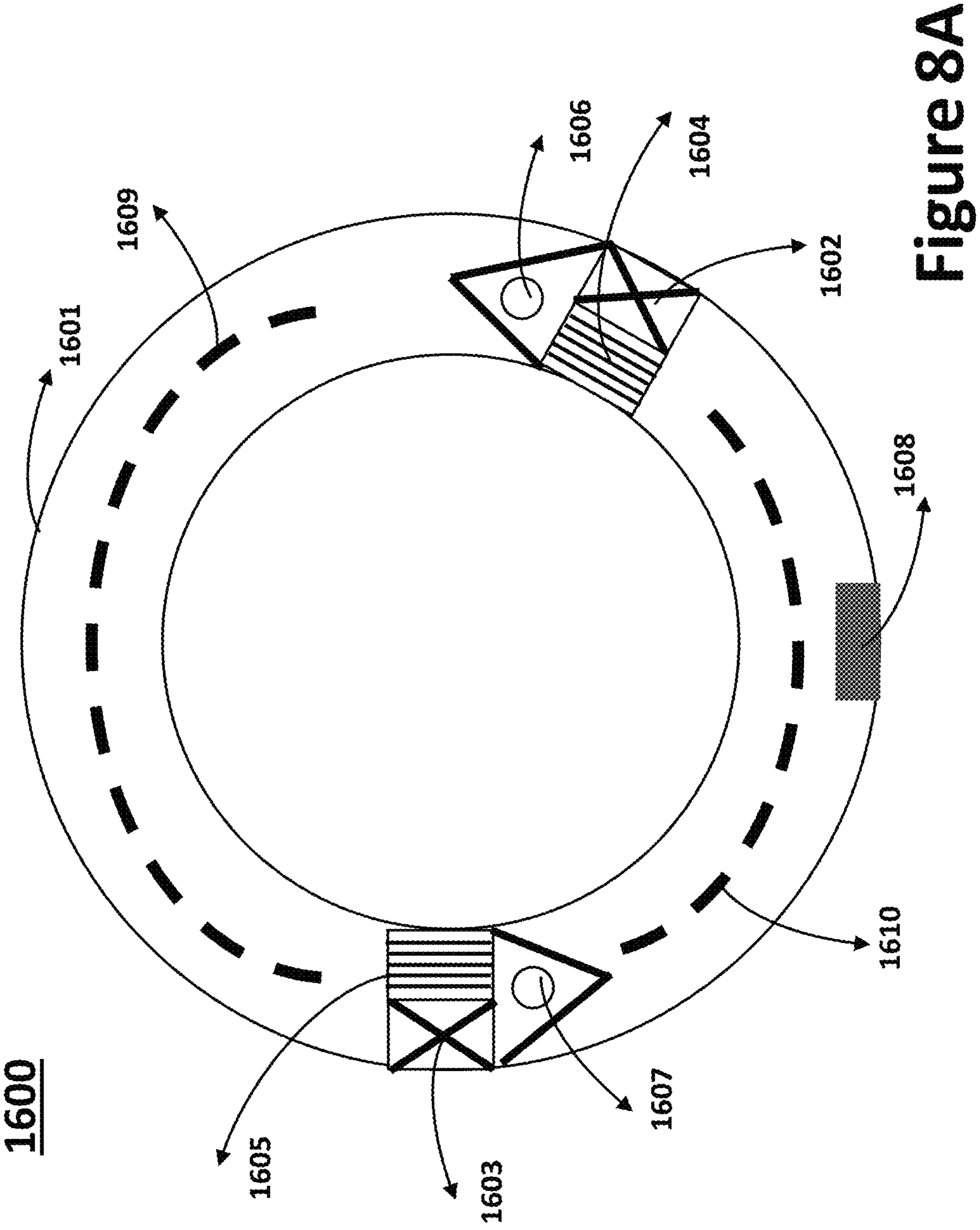
FIG. 8A depicts a head ring that supplies air to the mask.

FIG. 8A shows a detailed head ring 1600 which is used in FIG. 7 as head ring 1501. The head ring 1600 uses a fan 1602 to suck the air from environment, filter it with filter 1604 and send it from outlet 1606 into interior of the face mask 1504 through air pipe 1505. The contaminated air from interior of the face mask 1504 is sucked by the fan 1603 through the air pipe 1506 and the inlet 1607, filtered by the filter 1605 and released to the environment by the fan 1603.

Figure 8B:
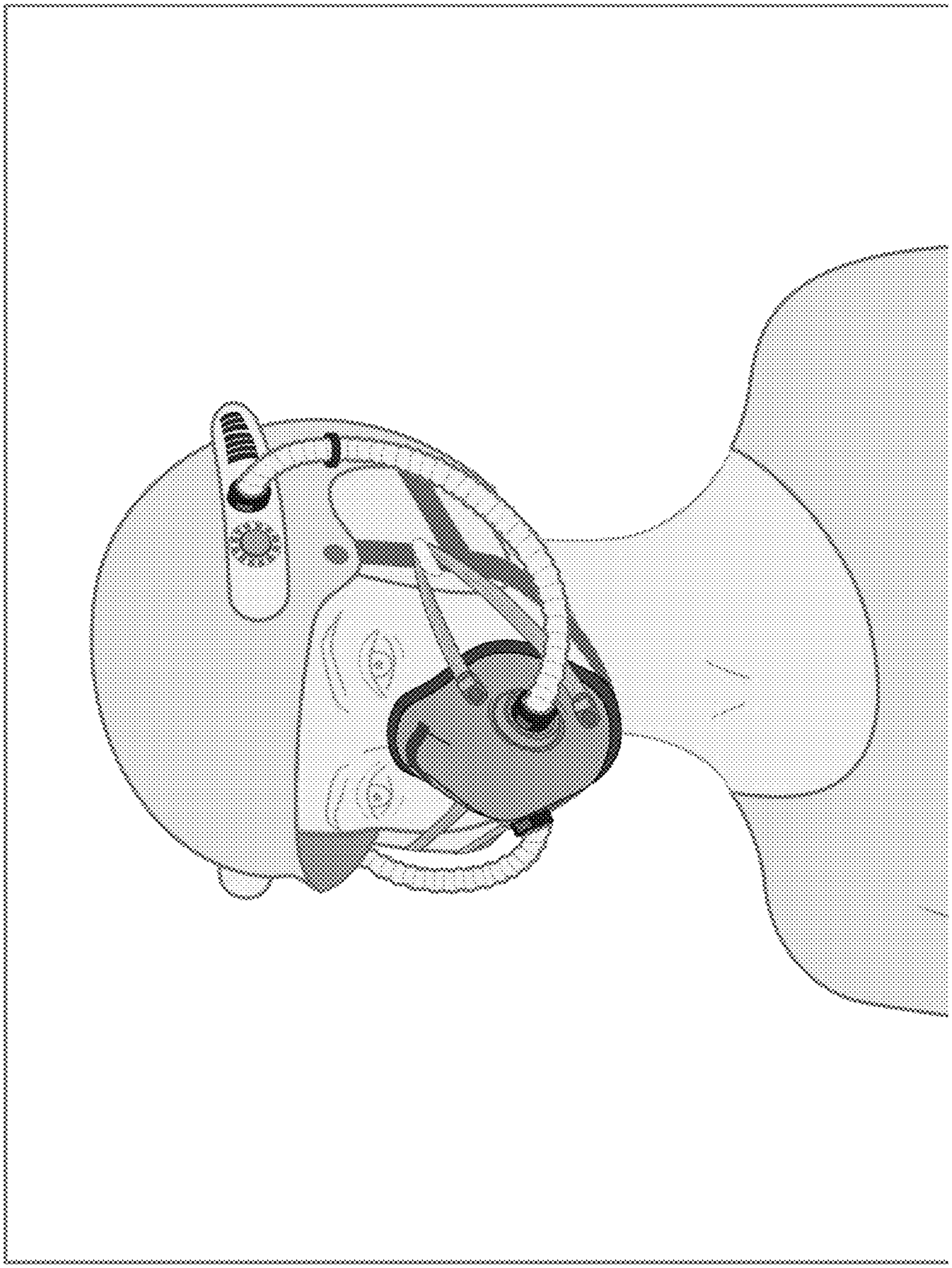
FIG. 8B illustrates a head ring attached to a helmet.

FIG. 8B shows how head ring 1600 is connected to a helmet. Helmets have different shapes and structures. The head ring when is connected to a helmet can be in one piece or two pieces. The head ring 1600 does not need to be a complete ring. When it has one piece only it can have an arc shape. When it has two pieces each piece can have an arc shape. For attaching the head ring to a helmet one can use Velcro fasteners and any other methods or means of fastening that are not permanent and after use ready can be detached and reused.

The head ring 1600, among other things includes a flexible tube (solid) 1601, sucking fans 1602 and 1603, filters 1604 and 1605, battery and controller housing 1608, outlet 1606 and inlet 1607.

The flexible tube 1601 can be solid or hollow depending on application of head ring 1600. The flexible tube 1601 is made of very light materials to keep the overall weight of the head ring 1600 low. The battery and controller housing 1608 accommodates the battery that powers the fans 1602, 1603, and a controller circuit with a CPU that controls the operation of the face mask with a head ring 1500. The outlet 1606 and inlet 1607 have circular (square, or other) cross sections and provide necessary requirements to connect to air pipes 1505 and 1506 without any leakage of air. The tube 1601 can have a key on its external surface for turning on and off the operation of the head ring 1600. The head ring 1600 can also have a reset bottom on the external surface of the tube 1601 to reset the controller circuit.

The fans 1602 and 1603 suck air from environment and interior of the face mask 1504 respectively and their sucking power is adjusted independently by controlling the DC voltage apply to them from the battery and controller circuit in housing 1608. The filters 1604 and 1605 both are either high efficiency particulate air (HEPA) filters, ultra-low particulate air (ULPA) filters, or a proprietary filter based on the application of the head ring 1600. The same filtering options explained in paragraph 0072 can also be used for the face mask with head ring 1500.

Head ring 1600 in addition to facilitating flow of fresh and filtered air inside the face mask performs cooling of the neck and face by blowing air towards the neck and face. The air sucked by fan 1602 is filtered by filter 1604 before sending portion of filtered air into the interior of the face mask 1504 from outlet 1606 through air pipe 1505 and blowing the remaining of the air through apertures or holes 1609 and 1610 towards the neck and face. The speed of the air flow from the apertures 1609 and 1610 can be adjusted by reducing the opening of the apertures or by totally closing selected number of apertures 1609 and 1610.

Contaminated air from face mask 1504 is sucked by fan 1603 through inlet 1607 and air pipe 1506, filtered by filter 1605, then sent to the aperture 1609 or 1610 for blowing towards the neck and face. Fan 1603 in addition to the contaminated air it sucks from interior of the mask through air pipe 1506 and inlet 1607 it can also suck air from environment through a separate inlet on the head ring tube 1601 to increase the amount of air that is blown towards neck and face through apertures 1609 and 1610.

Head ring 1600 can also be an oxygen tank for purified oxygen. Head ring 1600 facilitates flow of fresh and filtered air that is mixed with purified oxygen from the oxygen tank inside the tube 1601. The air sucked by fan 1602 from the environment is filtered by filter 1604 and mixed with injected purified oxygen before sending into the interior of the face mask 1504 from outlet 1606 and through air pipe 1505 like neck hanger 1200.

The head ring 1600 also like neck hanger 1200 can use a regulator. The regulator consists of a pressure reducer and a flow adjuster. These two components are adjusted mechanically by rotating them or other means. The oxygen tank can be a tank within the head ring tube 1601. The entire of head ring tube 1601 or a portion of it can be used as oxygen tank. It all depends on several parameters which are safety issues, weight, pressure of compressed oxygen (in any form, gas, solid or liquid), and complexity. The regulator should also function as a pressure gauge and a flow meter. One way of providing these two functions is to use sensors one as pressure sensor and another as flow sensor. The other approach is to have provisions for a pressure gauge and a flow meter to be connected to the regulator when needed like a valve that is used to refill the oxygen tank.

The sensors measure the pressure and the flow of the oxygen and send the information to the controller that is in the battery and controller housing. The speed of the fans is controlled by the controller by changing the DC (direct current) voltage applied to the sucking fans 1602 and 1603. The power and controller housing for battery and controller circuit can have a USB port or other power ports for charging the battery. The USB port is also used for communication between controller circuit and external devices. The controller circuit can also use a wireless transceiver like Bluetooth, Zigbee, Infrared, or WiFi (wireless fidelity) to communicate with external devices.

The controller circuit within the power and controller housing performs several tasks. One of the tasks is to control the speed of the fans by changing the DC voltage applied to the fans. The controller based on the information it obtains from various sensors decides what voltage to apply to the sucking fans 1602 and 1603. The decision is made by an artificial intelligence (AI) algorithm that is executed in the controller's CPU (central processing unit). A second task is to monitor the amount of charge of the batteries through appropriate sensors and use an LED (light emission diode) which is capable of deeming, a red LED when the charge is below a threshold and a green light when fully charged. It can also communicate to an external device like smart phone the amount of available charge. A third task is to monitor the pressure of oxygen tank and estimate the amount of oxygen in the tank and to indicate when the tank needs to be refilled through a red LED or communicating with an external device. A fourth task is to act as a flow meter for the regulator flow adjuster 1213 using a sensor that measures the oxygen flow. If the oxygen flow is below a threshold, controller indicates through an LED or communicates to an external device. A fifth task is to connect to an external device and configure the mask with head ring 1600. The configurations parameters are initial operating parameters of the face mask with head ring 1500 that include various thresholds, and settings. Another task of controller is to perform diagnostic and alarms.

Figure 9A:
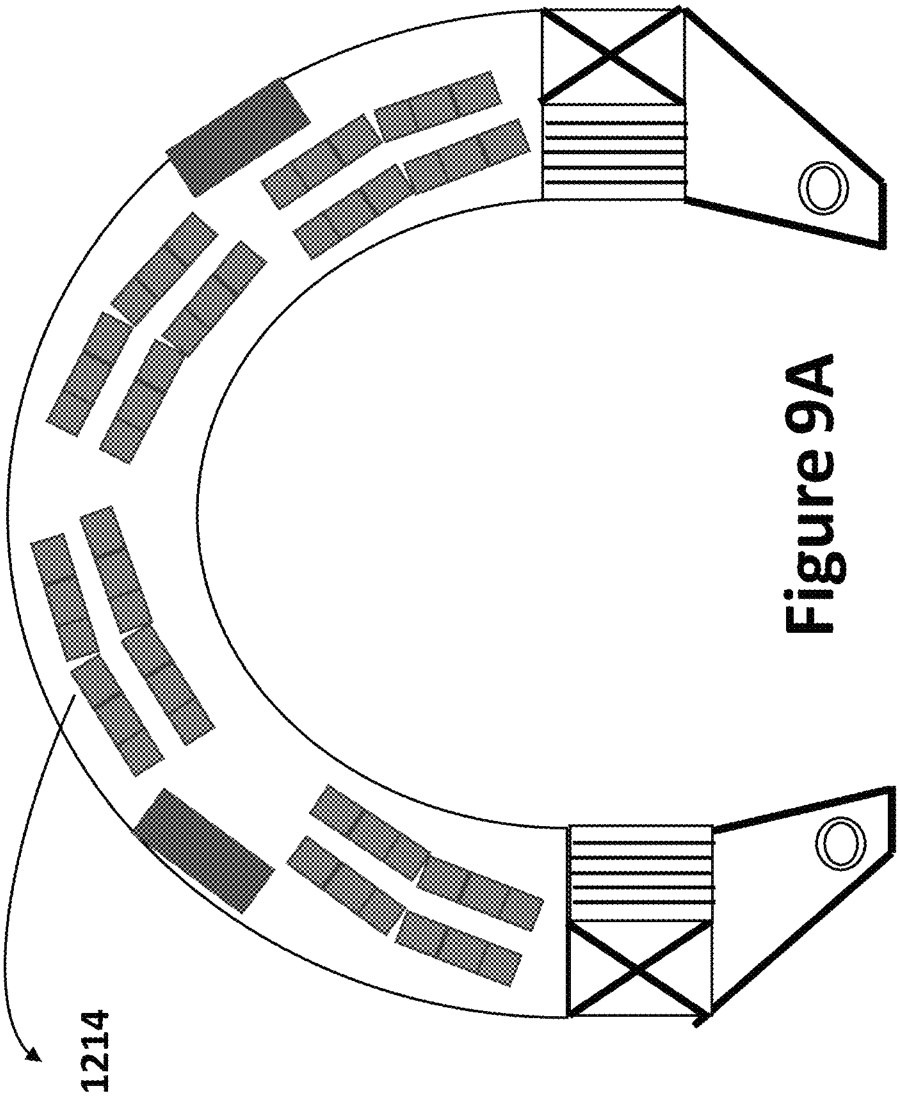
FIG. 9A shows locations on a neck hanger with solar panel.
Figure 9B:
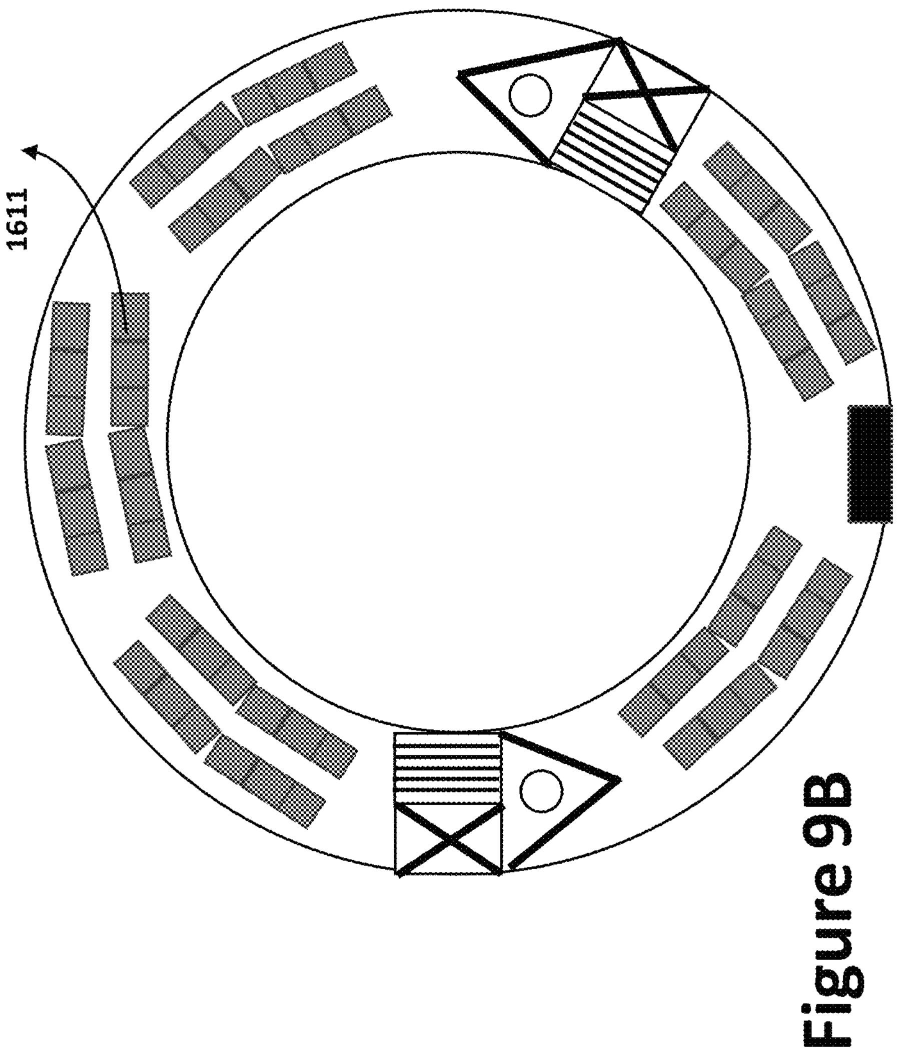
FIG. 9B shows a head ring with solar panel.
Figure 9C:
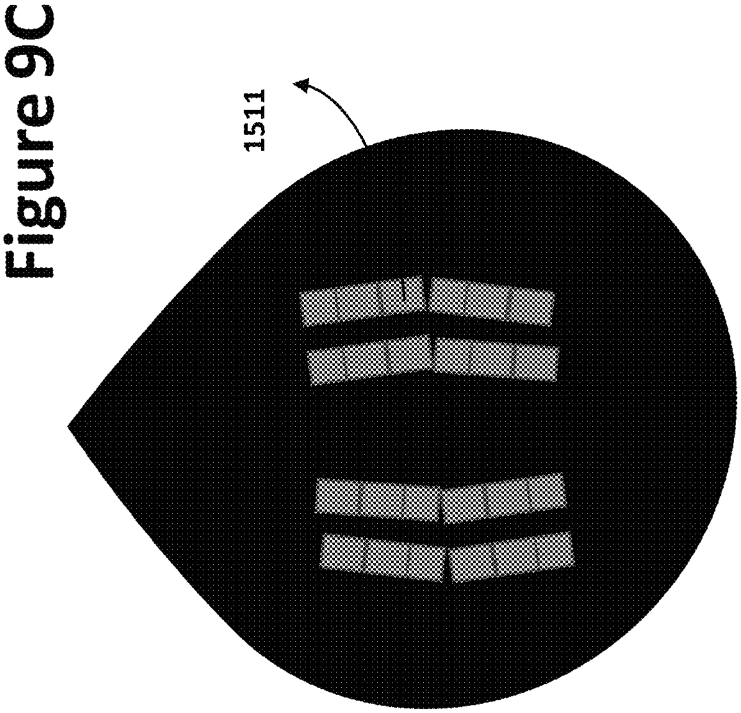
FIG. 9C depicts a face mask with solar panel.

As mentioned before the rechargeable battery can be fully or partially charged through solar cells. The solar cells 1511 may be attached to the external of the face mask as shown in FIG. 9C. The solar cells 1214 and 1611 are attached to the external peripheral of neck hanger 1200 and head ring 1600 as shown in FIGS. 9A and 9B. For both neck hanger 1200 and 1 head ring 1600 in the power and controller housing there is a DC (Direct Current) converter circuit to convert solar energy to the DC voltage required for charging the battery.

Sensors are located at various location of the face mask with a neck hanger 950 and the face mask with head ring 1500 to provide operation information data, measurement information data, and metering information data for the controller located in the battery and controller circuit housing. Controller circuit has a CPU (central processing unit) that receives all information data and use its artificial intelligence algorithm to monitor operation of the face mask with a neck hanger 950 or the face mask with a head ring 1500 in real time and control or modify operation of various components and alert the person wearing them if a deficiency, a problem of a mal function detected. Controller can use LED to show proper function, or mal function of various components. Controller can also use a wireless transceiver or a USB port to send status and real time value of certain parameters to an external device like a computer, a tablet, a smart phone to display numerically or graphically.

The sensors are attached at various locations of the mask with a neck hanger 950 and the mask with a head ring 1500. These location are inside of the mask for air flow, outside of the mask for solar panel and air pressure, inside of both air pipes, before air filters that are attached to both sucking fans, after the air filters to make sure filters function correctly and are not blocked, various location inside and outside peripheral of the neck hanger tube 1200 (1100) and head ring 1600 for air flow and solar panels, inside of the oxygen tank within neck hanger 1200 (1100) or head ring 1600 for pressure measurement, oxygen tank regulator (after pressure reducer and after flow adjuster), and inside of power and controller housing for monitoring battery power (charge, and other parameters). It is also possible to have sensors at other locations for other purposes like measuring the altitude (elevation) of the area a mask with oxygen capability is used from sea level. Elevation helps to measure the atmospheric pressure which results in calculating the oxygen level in the atmosphere air. The information data that sensors measure or collect are send to the controller CPU to be used by AI algorithm for analysis.

The sensors are not needed to be on continuously. To save power, the sensors are turn on during a time window configured in the control circuit, collect the required information data and then turned off. This can be done during a time window every 10 seconds or other configurations that are suitable for a particular application.

The face mask with a neck hanger (FMNH) 950 and the face mask with head ring (FMHR) 1500 act like an Internet of Thing (IoT) device. It can communicate with external devices and networks. Since both FMNH 950 and FMHR 1500 have operating fan, to make the battery last longer it is always possible to use an external auxiliary battery attached to waist or arm to support required power for both fans and controller circuit wireless transceiver that provides the function of IoT device and communicate real time or as needed with external devices or networks. The auxiliary battery is connected to the FMNH 950 and FMHR 1500 with a power cord through a USB power port or any other power port.

FMNH 950 and FMHR 1500 as IoT devices communicate with other IoT devices like smart phone, computers, and tablets through IoT networks that are fifth generation (5G) wireless network, sixth generation (6G) wireless network, beyond 5G/6G wireless network or Wireless Fidelity (WiFi) network.

FMNH 950 and FMHR 1500 as IoT devices through external devices (using Bluetooth, Zigbee, WiFi and infrared) as well as external devices that are attached to IoT networks can be configured, diagnosed, monitored, and updated with new software for the controller CPU. The analysis data from AI algorithm can be shared with external devices (through Bluetooth, Zigbee, WiFi and infrared) or devices that are attached to IoT network for monitoring as well as modifying the configuration parameters. The controller CPU can also send the raw data collected by various sensors to an external device the way that was explained above for analysis and decision making. The external device based on analysis of raw data decides whether there is a need for the modification of the operating parameters of the FMNH 950 or FMHR 1500 and through IoT network or using Bluetooth, Zigbee, Infrared, or WiFi performs the changing of the operation parameters.

In both cases of FMNH 950 and FMHR 1500 the face masks 951 and 1504 are attached to the face of the person wearing the FMNH and FMHR and cover the nose and the mouth of the person. The face masks 951 and 1504 are not attached to the nose and mouth of the person and there is a gap between the nose and mouth with the interior surface of the mask to allow for air flow within the interior of the mask. However, the peripheral of the face masks 951 and 1504 are attached to the face to prevent any air from environment to enter the interior of the mask and any interior air of the mask to leave the mask through peripheral of the face mask.

The face masks 951 and 1504 use ear loops to attached to the face of a person. For even better attachment it is possible to loop the left ear loop and the right ear loop and connect them together with a paperclip at the back of the head. Another technique for attaching the face mask to the face of the person is to attach the left ear loop to a strap and the right ear loop to another strap and fasten the two straps at the back of the head using hook and loop fastener made up of two pieces of materials: one with lots of tiny loops and another with lots of tiny hooks. Therefore, one of the straps acts as hook and the other strap acts as loop. The mask can also be attached to the face by any other feasible means that is obvious to a person with skill of fastening.

Various embodiments are thus described. While embodiments have been described, it should be appreciated that the embodiments should not be construed as limited by such description, but rather construed according to the following claims.

The invention claimed is:

1. A face mask (FM) with auxiliary oxygen comprising:
an oxygen tank;
a face mask;
a first air pipe; and
a second air pipe;
said oxygen tank that is configured to be hung from the neck of a wearer using said FM comprising:
a tube that has at least one of a horseshoe shape, and a U-shape with, the tube comprising:
an oxygen housing that stores a compressed oxygen with a regulator;
said regulator is used to regulate the compressed oxygen to provide an adjustable oxygen flow;
said adjustable oxygen flow is used in circumstances when oxygen is needed;
a first housing for a first sucking fan with a first filter, a second housing for a second sucking fan with a second filter, a third housing for a battery and a control circuit, an air outlet, an air inlet, and a plurality of opening holes on a peripheral of the tube;
said first sucking fan sucks an air from an environment, then the air is filtered by the first filter, mixed with said adjustable oxygen flow, and released into an interior of said face mask through the air outlet and said first air pipe;
the second sucking fan sucks an interior air of said face mask through said air inlet and the second air pipe, then the interior air is filtered by the second filter and released into said tube to be blown out through said plurality of opening holes;
said face mask comprising:
a mask that is configured to be worn by the wearer that use said FM and has a distance from the wearer for air flow;
a mask air inlet connected to the air outlet by said first air pipe for receiving the air after being filtered by said first filter and mixed with said adjustable oxygen flow; and
a mask air outlet connected to the air inlet by the second air pipe for delivering the interior air of the mask that is contaminated to the second filter to be filtered and released into the tube by said second sucking fan to be blown out through said plurality of opening holes.

2. The face mask (FM) of claim 1, wherein said regulator consists of a pressure reducer and a flow adjuster.

3. The face mask (FM) of claim 1, wherein said face mask is configured to be fastened to said wearer by a first ear loop and a second ear loop.

4. The face mask (FM) of claim 3, further said face mask is configured to be attached to the wearer by looping the first ear loop and the second ear loop and connecting them together with a paperclip at a back of the wearer.

5. The face mask (FM) of claim 3, wherein the first ear loop is attached to a first strap with a lot of tiny loops and the second ear loop is attached to a second strap with a lot of tiny hooks that are configured to be fasten at the back of the wearer.

6. The face mask (FM) of claim 1, wherein said first filter and said second filter are at least one of a HEPA (high efficiency particulate air) filter, and a ULPA (ultra-low particulate air) filter.

7. The face mask (FM) of claim 1, wherein said battery is rechargeable and is charged by a solar cell and at least one of an USB (universal serial bus) port, and a power port.

8. The face mask (FM) of claim 1, wherein an opening hole within said plurality of opening holes on the peripheral of said tube can be closed when not needed.

9. The face mask (FM) of claim 8, wherein the amount of air flow from the opening hole within the plurality of opening holes on the peripheral of said tube is based on a dimension of said opening hole.

10. The face mask (FM) of claim 9, wherein a dimension of said opening hole within said plurality of opening holes, depending on its location on the peripheral of said tube, is different to provide a uniform air flow.

* * * * *